US008508611B2

(12) United States Patent
Kasai et al.

(10) Patent No.: US 8,508,611 B2
(45) Date of Patent: Aug. 13, 2013

(54) IMAGE PROCESSING APPARATUS, IMAGE CAPTURING APPARATUS, IMAGE PROCESSING METHOD, AND PROGRAM FOR PERFORMING A COMPARISON PROCESS ON COMBINED IMAGES AND A MOTION AREA DETECTION PROCESS

(75) Inventors: Masanori Kasai, Kanagawa (JP); Satoru Takeuchi, Chiba (JP); Shun Kaizu, Tokyo (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 12/878,274

(22) Filed: Sep. 9, 2010

(65) Prior Publication Data
US 2011/0069205 A1 Mar. 24, 2011

(30) Foreign Application Priority Data

Sep. 18, 2009 (JP) ................................ P2009-216529
Dec. 18, 2009 (JP) ................................ P2009-288018

(51) Int. Cl.
*H04N 5/228* (2006.01)
(52) U.S. Cl.
USPC ....................................................... 348/222.1
(58) Field of Classification Search
USPC ................... 348/208.99, 208.1, 208.3, 208.4, 348/208.5, 208.6, 222.1, 221.1, 229.1
See application file for complete search history.

(56) References Cited

U.S. PATENT DOCUMENTS

| 7,098,946 B1* | 8/2006 | Koseki et al. ............... 348/229.1 |
| 7,301,563 B1* | 11/2007 | Kakinuma et al. ....... 348/208.13 |
| 7,349,119 B2* | 3/2008 | Tsukioka ..................... 358/1.18 |
| 7,711,254 B2* | 5/2010 | Yamasaki ........................ 396/55 |
| 7,714,903 B2* | 5/2010 | Pertsel et al. ............... 348/229.1 |
| 7,755,664 B2* | 7/2010 | Kakinuma et al. .......... 348/208.1 |
| 2002/0154829 A1* | 10/2002 | Tsukioka ........................ 382/254 |
| 2006/0017813 A1* | 1/2006 | Okubo et al. ............... 348/208.2 |
| 2006/0133688 A1 | 6/2006 | Kang et al. |
| 2007/0146538 A1* | 6/2007 | Kakinuma et al. ............ 348/362 |
| 2008/0095408 A1* | 4/2008 | Yokohata et al. ............. 382/106 |
| 2008/0219585 A1 | 9/2008 | Kasai et al. |
| 2008/0259181 A1* | 10/2008 | Yamashita et al. ......... 348/229.1 |

FOREIGN PATENT DOCUMENTS

| EP | 0 977 432 A2 | 2/2000 |
| EP | 0 977 432 A3 | 2/2000 |
| JP | 2000-050151 | 2/2000 |
| JP | 2008-099158 | 4/2008 |

OTHER PUBLICATIONS

J. Konrad, "Motion Detection and Estimation", Handbook of Image and Video Processing, pp. 207-225, XP-002496397 (2000).

(Continued)

*Primary Examiner* — Nicholas Giles
(74) *Attorney, Agent, or Firm* — Finnegan, Henderson, Farabow, Garrett & Dunner, L.L.P.

(57) ABSTRACT

Provided is an image processing apparatus including: an image combination unit which generates combined images by combining photographed images having different exposure times; and a motion area detection unit which performs a comparison process on a plurality of the combined images generated by the image combination unit to acquire a pixel value difference and which performs a motion area detection process of comparing the pixel value difference with a predetermined threshold value and determining a pixel area, of which the pixel value difference is equal to or larger than the threshold value, to be a motion area where motion of a subject is estimated to have occurred.

8 Claims, 25 Drawing Sheets

(56) References Cited

OTHER PUBLICATIONS

O. Gallo et al., "Artifact-free High Dynamic Range Imaging", 2009 IEEE International Conference on Computational Photography, 7 pages, XP002612399 (2009).

T. Grosch, "Fast and Robust High Dynamic Range Image Generation with Camera and Object Movement", Vision, Modeling, and Visualization 2006: Proceedings, 9 pages, XP002612400 (2006).

K. Jacobs et al., "Automatic High-Dynamic Range Image Generation for Dynamic Scenes", IEEE Computer Graphics and Applications, vol. 27, No. 2, pp. 84-93, XP011205233 (2008).

E. Bennett et al., "Video Enhancement Using Per-Pixel Virtual Exposures", ACM Transactions on Graphics, pp. 845-852, XP002477673 (2005).

European Search Report issued Dec. 13, 2010, in Munich, in corresponding EP 10 17 6461.

* cited by examiner

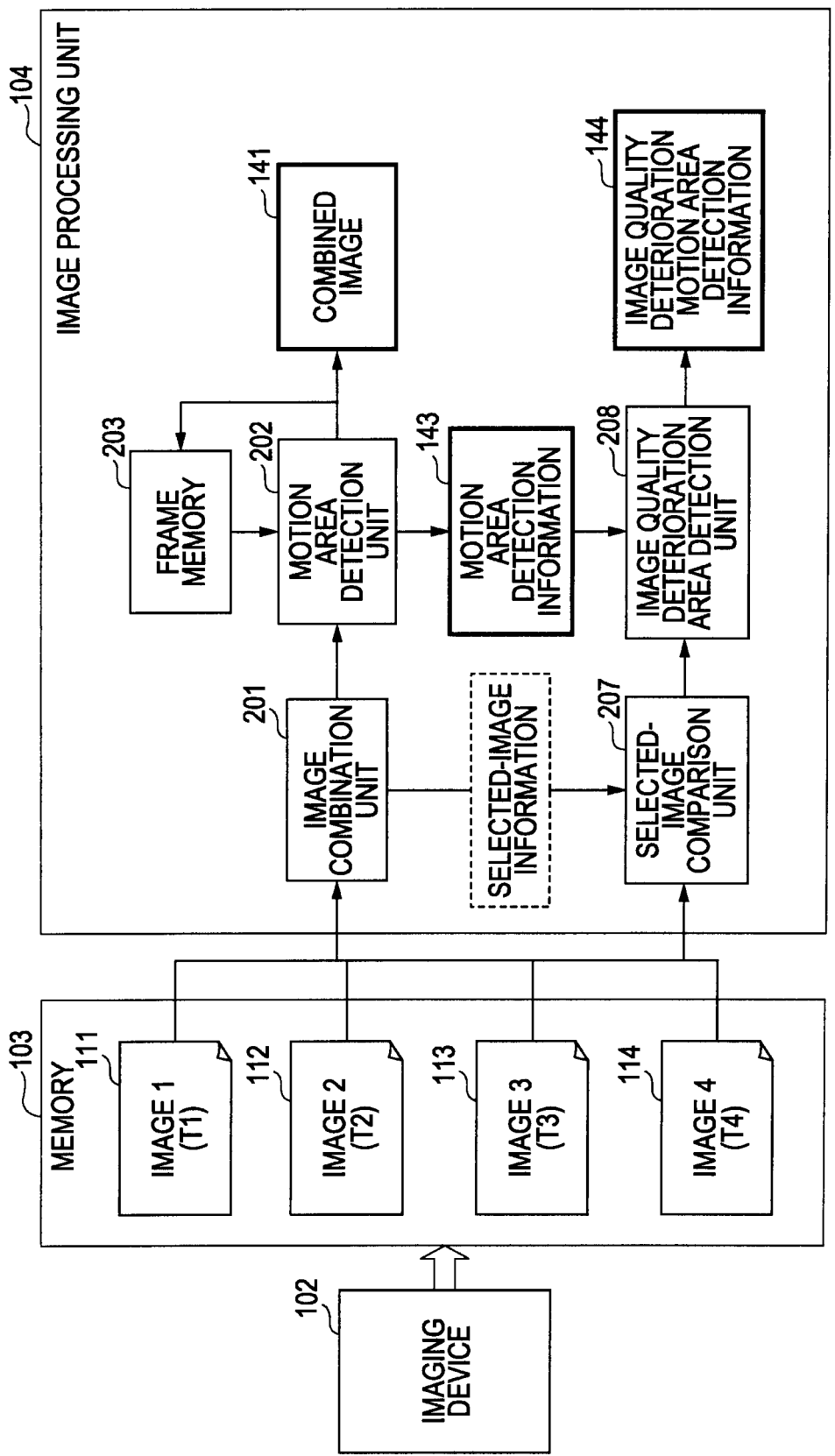

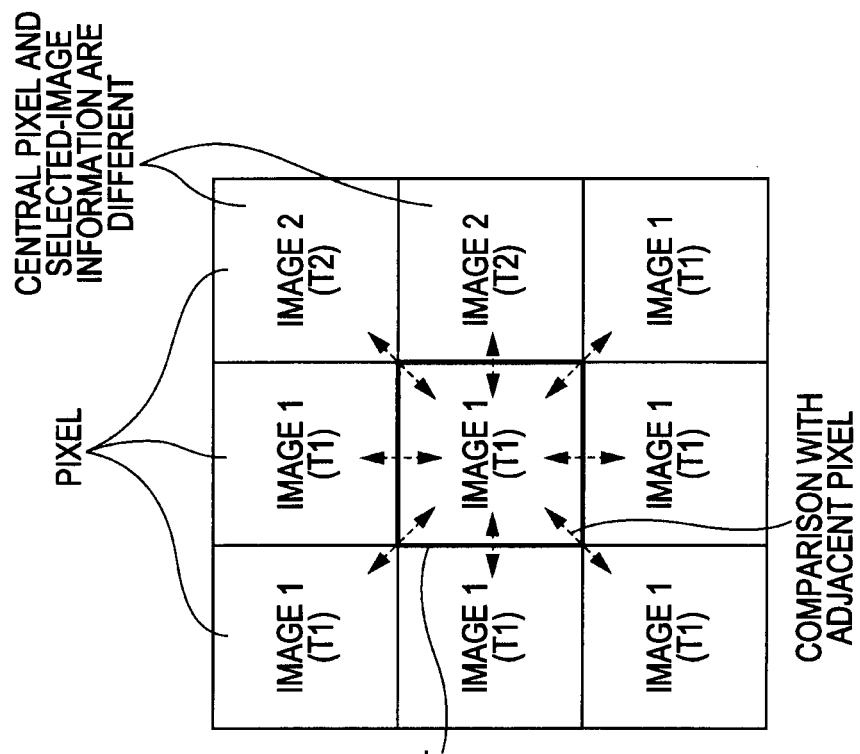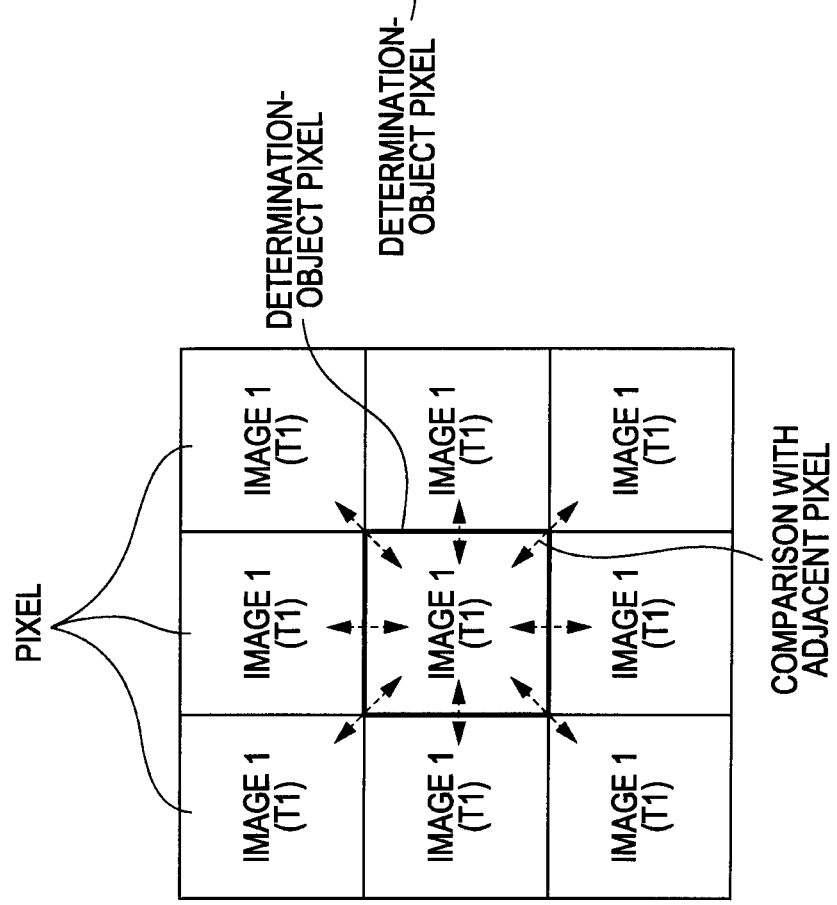

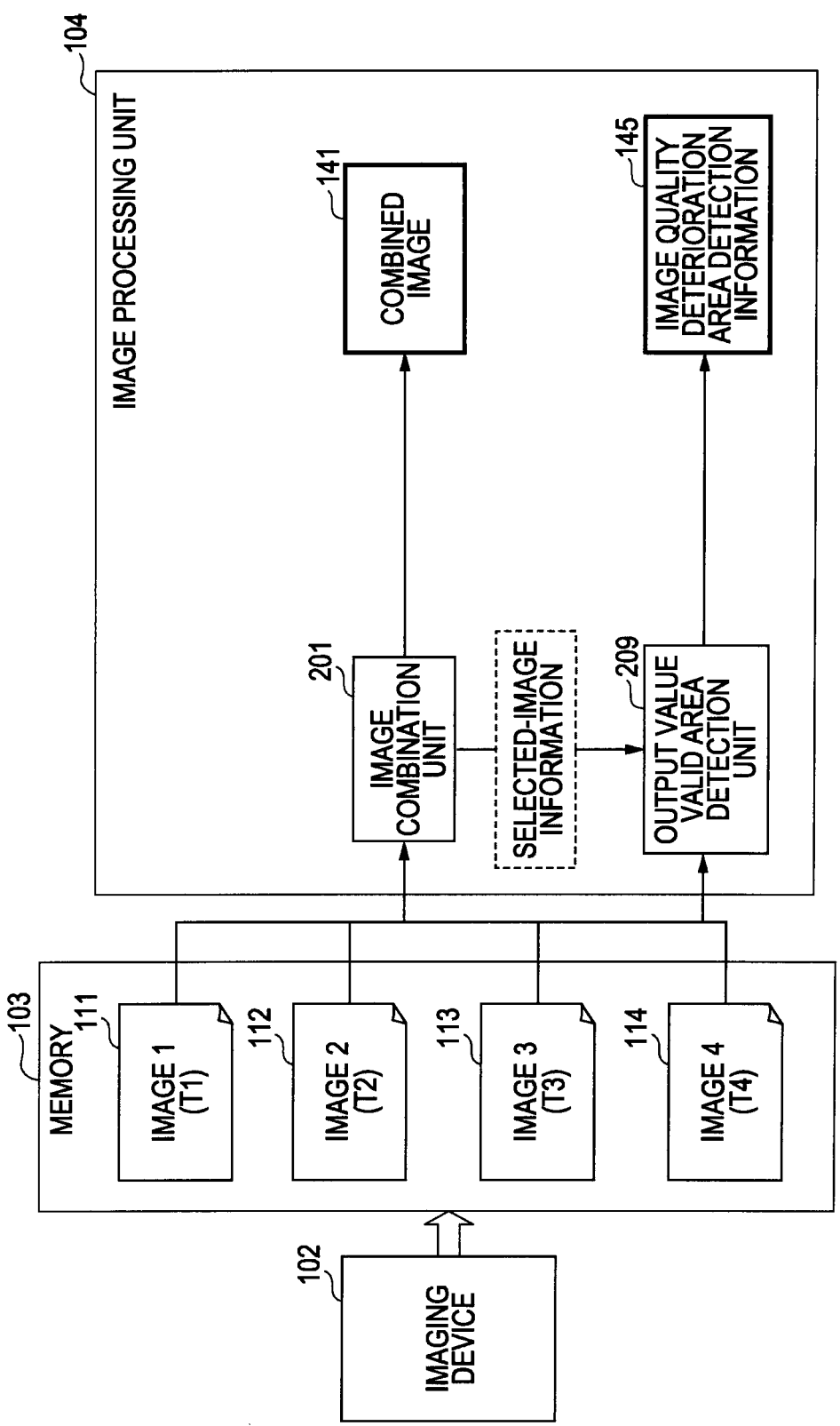

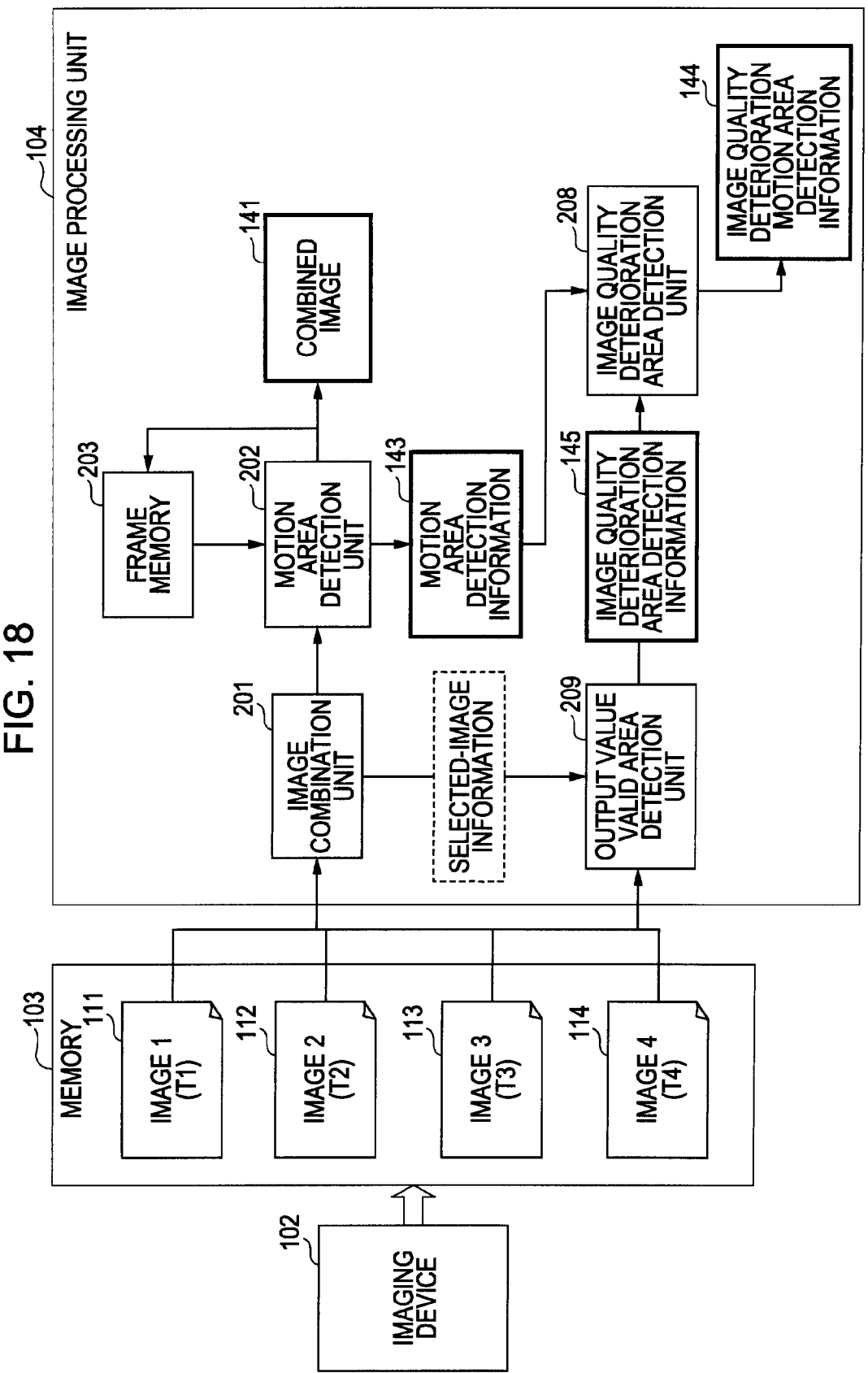

IMAGE PROCESSING APPARATUS, IMAGE CAPTURING APPARATUS, IMAGE PROCESSING METHOD, AND PROGRAM FOR PERFORMING A COMPARISON PROCESS ON COMBINED IMAGES AND A MOTION AREA DETECTION PROCESS

BACKGROUND OF THE INVENTION

1. Field of the Present Invention

The invention relates to an image processing apparatus, an image capturing apparatus, an image processing method, and a program, and more particularly, to an image processing apparatus, an image capturing apparatus, an image processing method, and a program capable of generating a high quality output image having a wide dynamic range by an image combining process using a plurality of images having different exposure times.

2. Description of the Related Art

A solid-state imaging device such a CCD image sensor or a CMOS (Complementary Metal Oxide Semiconductor) image sensor used for a video camera, a digital still camera, or the like performs photoelectric conversion of storing charges according to an incident light amount and outputting an electrical signal corresponding to the accumulated charges. However, since there is an upper limit to the charge accumulation amount in a photoelectric conversion element, if a predetermined light amount or more is received, an accumulated charge amount reaches a saturated level so that a so-call white-out where the saturated luminance level is set occurs in a subject area of which the brightness is a predetermined value or more.

In order to prevent this phenomenon, there has been a process where an exposure time is adjusted by controlling a charge accumulation period in the photoelectric conversion element according to an external light change or the like, so that sensitivity is controlled to an optimum value. For example, with respect to a bright subject, the charge accumulation period in the photoelectric conversion element is reduced by shortening the exposure time by a high speed shutter release, so that the electrical signal is output before the accumulated charge amount reaches the saturated level. By such a process, an image where the grayscale according to the subject is accurately reproduced can be output.

However, in the photographing of a subject where bright and dark portions are mixed, if the high speed shutter release is used, a sufficient exposure time is not secured for the dark portion. Therefore, the S/N is decreased, so that the image quality deteriorates. In this way, in the image photographing of the subject where the bright and dark portions are mixed, in order to accurately reproduce the luminance levels of the bright and dark portions, for a pixel of an image sensor where the incident light amount is small, high S/N may have to be implemented by a long exposure time, and for a pixel where the incident light amount is large, a process of avoiding the saturation may have to be provided.

As a method of implementing such a process, there has been known a method of using a plurality of images having different exposure times. In other words, in the method, a long time exposure image is used for a dark image area, and a short time exposure image is used for a bright image area which is whited out in the long time exposure image, so that an optimum pixel level can be determined. In this manner, by combining a plurality of images having different exposures, an image having a wide dynamic range, where there is no white-out, can be obtained.

For example, Japanese Unexamined Patent Application Publication No. 2008-99158 discloses a configuration of obtaining an image having a wide dynamic range by combining a plurality of images having different exposure amounts. The process is described with reference to FIG. 1. For example, in the moving picture photographing, an imaging device outputs two image data having different exposure times within a video rate (30-60 fps). In addition, in the still picture photographing, the imaging device also generates and outputs two image data having different exposure times. FIG. 1 is a diagram illustrating characteristics of the two images (the long time exposure image and the short time exposure image) having different exposure times generated by the imaging device. The horizontal axis is a time (t), and the vertical axis is an accumulated charge amount (e) in a light sensing photodiode (PD) constituting a photoelectric conversion element corresponding to one pixel of a solid-state imaging device.

For example, in the case where a sensed light amount of the light sensing photodiode (PD) is large, that is, in the case corresponding to a bright subject, as illustrated in a high luminance area 11 in FIG. 1, the charge accumulation amount is rapidly increased as time elapses. On the other hand, in the case where the sensed light amount of the light sensing photodiode (PD) is small, that is, in the case corresponding to a dark subject, as illustrated in a low luminance area 12 of FIG. 1, the charge accumulation amount is gradually increased as time elapses.

The times t0 to t3 correspond to the exposure time TL for obtaining the long time exposure image. With respect to the line illustrated in a low luminance area 12 where the exposure time TL is set to a long time, at the time t3, the charge accumulation amount does not reach a saturated level (unsaturated point Py). Therefore, an accurate grayscale expression can be obtained by the grayscale level of the pixel which is determined by using an electrical signal obtained based on the charge accumulation amount (Sa).

However, with respect to the line illustrated in a high luminance area 11, it is apparent that, before the time t3, the charge accumulation amount already reaches a saturated level (saturated point Px). Therefore, in such a high luminance area 11, only the pixel value corresponding to the electrical signal having the saturated level is obtained from the long time exposure image, so that the whited-out pixel is formed.

Therefore, in such a high luminance area 11, in a time before the time t3, for example, in the time t1 (charge sweeping starting point P1) illustrated in the figure, the accumulated charges in the light sensing photodiode (PD) are swept out. The charge sweeping is not performed on all the charges accumulated in the light sensing photodiode (PD), but it is performed to the intermediate voltage sustaining level controlled in the photodiode (PD). After the charge sweeping process, the short time exposure is performed again with the exposure time TS (t2 to t3). In other words, the short time exposure is performed during the period from the short time exposure starting point P2 to the short time exposure ending point P3 illustrated in the figure. The charge accumulation amount (Sb) is obtained by the short time exposure, and the grayscale level of the pixel is determined based on the electrical signal, which is obtained based on the charge accumulation amount (Sb).

In addition, in the case where the pixel value is determined based on the electrical signal, which is obtained based on the charge accumulation amount (Sa) obtained by the long time exposure in the low luminance area 12, and the electrical signal, which is obtained based on the charge accumulation amount (Sb) obtained by the short time exposure in the high luminance area 251, an estimated charge accumulation amount of the case of performing exposure for the same time or an electrical signal output value corresponding to the estimated charge accumulation amount is calculated, and the pixel value level is determined based on the calculated result.

In this manner, by combining the short time exposure image and the long time exposure image, an image having a wide dynamic range, where there is no white-out, can be obtained.

However, the plurality of the images having different exposure amounts is the images that are photographed at the timings different in terms of time. Therefore, if a motion of the subject occurs during the time, there are differences in the images at the time of combining the images. As a result, occurrence of pseudo color in an image area of the moving subject area results in a problem of deterioration in the image quality or the like.

As a related art disclosing a technology for reducing such a problem, there is, for example, Japanese Unexamined Patent Application Publication No. 2000-50151.

In Japanese Unexamined Patent Application Publication No. 2000-50151, disclosed is a configuration of comparing a plurality of images having different exposure amounts to specify a pixel area where there is a motion and performing correction. The details of the process are as follows. First, a long time exposure image (LE) and a short time exposure image (SE) are acquired, and an exposure ratio A (=LE/SE), which is a ratio of the exposure amount of the long time exposure image (LE) to the exposure amount of the short time exposure image (SE) is obtained. Furthermore, with respect to each pixel, (LE−SE×A) is calculated. In the case where the completely identical subject is photographed, (LE−SE×A) =0. With respect to a pixel where (LE−SE×A)=0 is not satisfied, there is a high possibility that different subjects are photographed in the long time exposure image (LE) and the short time exposure image (SE), and such a pixel area is identified as a motion area.

In other words, in the case where the same subject is photographed, a correspondence relationship between the output value (luminance) of the long time exposure image (LE) and the output value (luminance) of the short time exposure image (SE) is set on the line of a slope A (=exposure ratio) as illustrated in FIG. 2. In the case where the correspondence relationship deviates from the line, it is determined that there is a motion in the area.

However, in an actual case, since there is a variation in the special products of a PD or a transistor constituting the imaging device, it is difficult to accurately determine based on the satisfaction or otherwise of (LE−SE×A)=0 whether or not there is motion of the subject. For example, a little variation between the devices can be reduced by setting a threshold value (Th) and determining whether or not |LE−SE×A|<Th is satisfied. However, since the variation between the devices is varied according to the apparatuses, there is a problem in that it is difficult to set an optimum threshold value.

SUMMARY OF THE INVENTION

It is desirable to provide an image processing apparatus, an image capturing apparatus, an image processing method, and a program capable of accurately determining an area where there is motion of a subject, which may cause deterioration in an image quality such as an occurrence of pseudo color at the time of generating an image having a wide dynamic range by combining a plurality of images having different exposure times.

In a first embodiment of the invention, there is provided an image processing apparatus including: an image combination unit which generates combined images by combining photographed images having different exposure times; and a motion area detection unit which performs a comparison process on a plurality of the combined images generated by the image combination unit to acquire a pixel value difference and which performs a motion area detection process of comparing the pixel value difference with a predetermined threshold value and determining a pixel area, of which the pixel value difference is equal to or larger than the threshold value, to be a motion area where motion of a subject is estimated to have occurred.

In addition, in the image processing apparatus according to an embodiment of the invention, the image combination unit is configured to generate the combined images by combining a newly input image and an input-completed photographed image having a different exposure time every time when one photographed image having a different exposure time is input, and the motion area detection unit performs the motion area detection process by comparing the pixel values of the corresponding pixels of two consecutive combined images generated by the image combination unit.

In addition, in the image processing apparatus according to an embodiment of the invention, the image processing apparatus includes: a before-combination image comparison unit which acquires the pixel value difference between to-be-combined images by comparing output values of the corresponding pixels between the to-be-combined images, which are sources for generation of the combined images; and an over-detection removing unit which compares the pixel value difference between the to-be-combined images with a predetermined second threshold value and determines a pixel area, of which the pixel value difference between to-be-combined images is less than the second threshold value, not to be the motion area with respect to the corresponding pixels of the motion area detected by the motion area detection unit.

In addition, in the image processing apparatus according to an embodiment of the invention, the image processing apparatus includes an image quality deterioration area detection unit which determines a pixel area in which pixels of the photographed images having different exposure times are set to the adjacent pixels on the combined images as an image quality deterioration area by using pixel-corresponding selection information of the to-be-combined images, which are sources for generation of the combined images, and outputs image quality deterioration motion area detection information in which a pixel area, which is the motion area detected by the motion area detection unit and which is the image quality deterioration area, is extracted as an image quality deterioration motion area.

In addition, in the image processing apparatus according to an embodiment of the invention, the image processing apparatus includes: an output value valid area detection unit which acquires pixel values of the to-be-combined images with respect to the pixels of the combined images by using pixel-corresponding selection information on the to-be-combined images, which are sources for generation of the combined images, and determines the pixel area to have a low validity of an output value in the case where the pixel values of the to-be-combined images are in the vicinity of zero or a saturated value; and an image quality deterioration area detection unit which determines the pixel area having a low validity of the output value detected by the output value valid area detection unit as an image quality deterioration area having a high possibility of the image quality deterioration and which outputs image quality deterioration motion area detection information indicating that the pixel area, which is the motion area detected by the motion area detection unit and which is the image quality deterioration area, is extracted as the image quality deterioration motion area.

In addition, in the image processing apparatus according to an embodiment of the invention, the image processing apparatus includes: a second motion area detection unit which determines the pixel, which is a pixel of a long time exposure image as a pixel used for the combined images and which has a valid pixel value so that a value of a pixel of a short time exposure image corresponding to the pixel is not in the vicinity of zero, to be in the motion area by using pixel-corresponding selection information of the to-be-combined images which are sources for generation of the combined images; and a detection result integration unit which outputs motion area detection information in which the area, which is determined to be the motion area by the motion area detection unit and which is determined to be the motion area by the second motion area detection unit, is set to a final motion area.

In a second embodiment of the invention, there is provided an image processing apparatus including: an image combination unit which generates combined images by combining photographed images having different exposure times; and an output value valid area detection unit which acquires pixel values of the to-be-combined images with respect to the pixels of the combined images by using pixel-corresponding selection information on the to-be-combined images, which are sources for generation of the combined images, determines the pixel area to have a low validity of an output value in the case where the pixel values of the to-be-combined images are in the vicinity of zero or a saturated value and outputs image quality deterioration area detection information in which the area is clearly indicated as an image quality deterioration area having a high possibility of the image quality deterioration.

In a third embodiment of the invention, there is provided an image processing apparatus including: an image combination unit which generates combined images by combining photographed images having different exposure times; and a motion area detection unit which determines a pixel, which is a pixel of a long time exposure image and which has a valid pixel value so that a value of a pixel of a short time exposure image corresponding to the pixel is not in the vicinity of zero, to be in the motion area by using pixel-corresponding selection information of the to-be-combined images, which are sources for generation of the combined images, and outputs motion area detection information which clearly indicates the motion area.

In a fourth embodiment of the invention, there is provided an image processing apparatus including a detection unit which calculates a difference between a pixel value difference of a corresponding pixel of a photographed image having a different exposure time and predetermined correlation information and determines that there is a motion area in the case where the difference is larger than a predetermined threshold value.

In addition, in the image processing apparatus according to an embodiment of the invention, the correlation information is generated based on correlation of output values of the images having the different exposure times as comparison objects.

In a fifth embodiment of the invention, there is provided an imaging apparatus having an image processing apparatus, wherein the image processing apparatus further includes: an imaging device which captures photographed images having different exposure times; and an image processing unit which performs the imaging process.

In a sixth embodiment of the invention, there is provided an image processing method performed in an image processing apparatus, including the steps of: an image combination unit, generating combined images by combining photographed images having different exposure times; and a motion area detection unit, performing a comparison process on a plurality of the combined images generated by the image combination unit to acquire a pixel value difference and performing a motion area detection process of comparing the pixel value difference with a predetermined threshold value and determining a pixel area, of which the pixel value difference is equal to or larger than the threshold value, to be a motion area where motion of a subject is estimated to have occurred.

In a seventh embodiment of the invention, there is provided a program allowing an image processing apparatus to execute an imaging process, including the steps of: allowing an image combination unit to generate combined images by combining photographed images having different exposure times; and allowing a motion area detection unit to perform a comparison process on a plurality of the combined images generated by the image combination unit to acquire a pixel value difference and to perform a motion area detection process of comparing the pixel value difference with a predetermined threshold value and determining a pixel area, of which the pixel value difference is equal to or larger than the threshold value, to be a motion area where motion of a subject is estimated to have occurred.

In addition, the process according to the invention is, for example, a program which may be provided through a storage medium or a communication medium in a computer readable format to an information processing apparatus or a computer/system which may execute various programs/codes. Such a program is provided in a computer readable format, so that processes according to the program are implemented in the information processing apparatus or the computer/system.

The other objects, features, or advantages of the invention will be clarified through detailed description based on the later-described embodiments of the invention or the accompanying drawings. In addition, in the specification, a system denotes a logically integrated configuration of a plurality of apparatuses, and each apparatus of the configuration is not limited to be included within the same casing.

According to a configuration of one embodiment of the invention, in a process of inputting a plurality of images having different exposure times and generating an image having a wide dynamic range by selectively combining valid pixel values, it is possible to effectively detect a motion area of a subject, which causes occurrence of image quality deterioration such as pseudo color. For example, comparison of combined images generated from the plurality of the images having different exposure times is performed, and the motion area is detected based on the result of the comparison. According to the process, it is possible to perform highly-accurate motion area detection capable of suppressing error detection caused from a difference in characteristics of an imaging device.

BRIEF DESCRIPTION OF THE DRAWINGS

FIG. 15 is a block diagram illustrating a process of the image processing apparatus according to the fourth embodiment.

FIGS. 16A and 16B are diagrams illustrating a comparison process of comparing a detection object pixel with adjacent pixels.

FIG. 17 is a block diagram illustrating a process of an image processing apparatus according to a fifth embodiment.

FIG. 18 is a block diagram illustrating a process of an image processing apparatus according to a sixth embodiment.

DESCRIPTION OF THE PREFERRED EMBODIMENTS

Hereinafter, an image processing apparatus, an image capturing apparatus, an image processing method, and a program according to the invention are described with reference to the drawings. The description is made in the following order.

1. Entire Configuration of Image Processing Apparatus
2. Detailed Embodiments of Image Processing Apparatus

1. Entire Configuration of Image Processing Apparatus

First, an example of the entire configuration of an image processing apparatus according to the invention is described with reference to FIG. 3.

Figure 3:
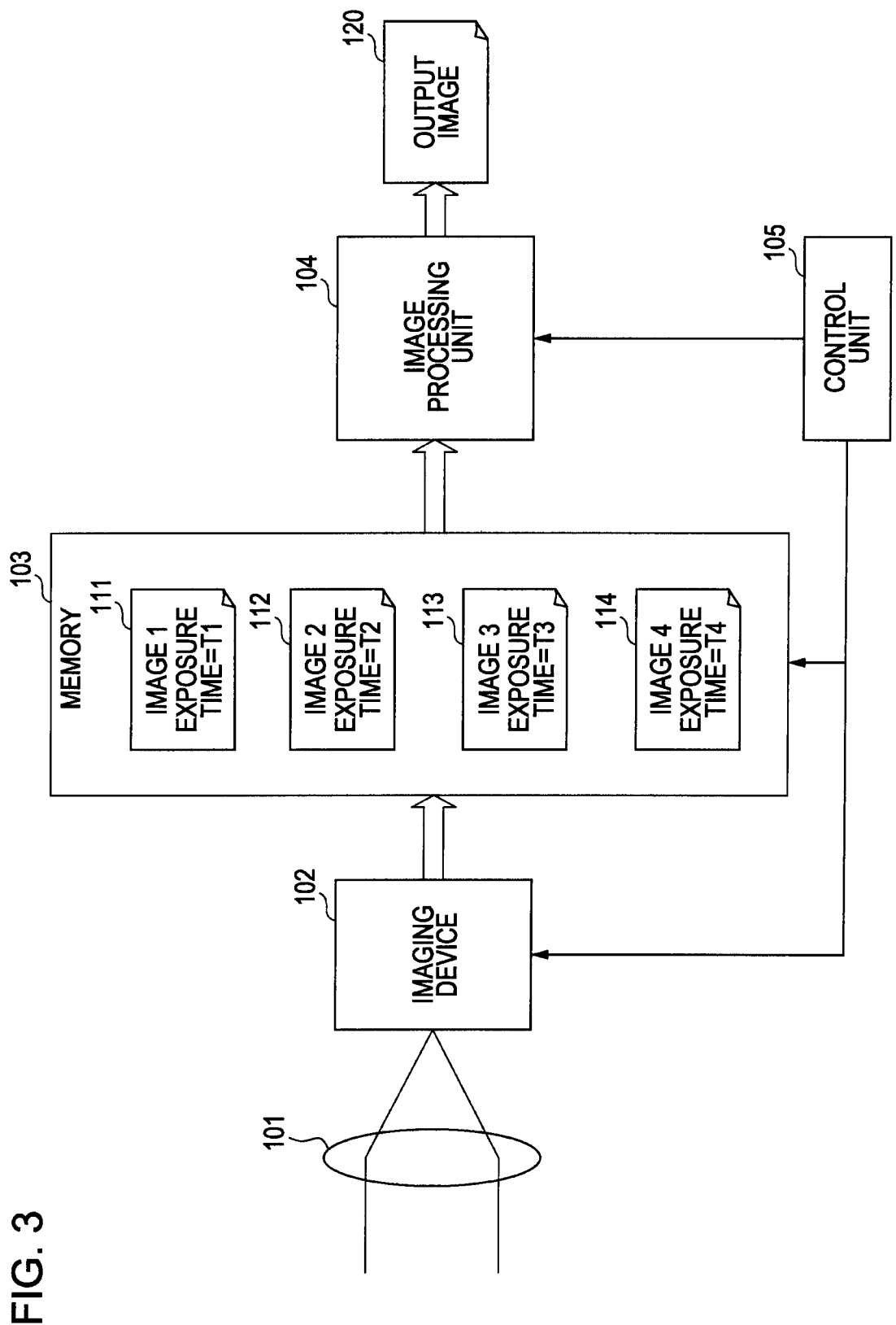
FIG. 3 is a diagram illustrating an example of the entire configuration of an image processing apparatus according to the invention.

FIG. 3 is a block diagram illustrating an example of a configuration of an image capturing apparatus as an example of the image processing apparatus according to the invention. Light entering through an optical lens 101 is incident to an imaging device 102 which is constructed with, for example, a CMOS image sensor or the like, and an image data obtained through photoelectric conversion is output. The output image data is input through a memory 103 to an image processing unit 104. A control unit 105 outputs a control signal to each component according to a program stored in, for example, a memory (not shown) to control various processes.

The imaging device 102 generates a plurality of images 111 to 114 having different exposure times. The image processing unit 104 is input with the plurality of the images 111 to 114 having the different exposure times and performs a combination process to generate an output image 120. In the embodiments described hereinafter, the description is made in the configuration that the image processing unit 104 is input with four types of images having different exposure times from the imaging device 102. In other words, as illustrated in FIG. 3, the images are as follows.

Image 1 (exposure time T1) 111
Image 2 (exposure time T2) 112
Image 3 (exposure time T3) 113
Image 4 (exposure time T4) 114
Herein, T1<T2<T3<T4.

The image processing unit 104 is input with four types of the images having different exposure times (T1 to T4) from the imaging device 102 to generate the output image 120 based on the plurality of the images having different exposure times.

As described above, an electric signal output from the imaging device depends on an amount of the light incident to the imaging device. Therefore, in the case of a certain exposure time (long time exposure), the electrical signals output from photoelectric conversion elements in pixels corresponding to a brighter subject may reach a saturated level. As a result, these pixels become so-called white-out pixels in which the electrical signals corresponding to the saturated level are output so that grayscale differences are not perceivable.

For example, since such white-out is avoided in order to obtain an output in which the luminance level of the subject is reflected, a plurality of image data in a range of from the long time exposure to the short time exposure are allowed to be generated, and the image processing unit 104 performs a combination process on the plurality of the images to obtain an output image 120. For example, with respect to a pixel which is estimated to reach the saturated level by performing the long time exposure, such a process of calculating a pixel value based on the data obtained by performing the short time exposure and outputting the pixel value is performed.

The process of acquiring a plurality of images having different exposure times is disclosed in Japanese Unexamined Patent Application Publication No. 2008-99158 or 2008-227697, which is filed by the same applicant as that of the invention. Basically, the plurality of images having different exposure times are acquired by the same method as that disclosed therein, so that a combined image is generated where the white-out pixels do not occur. In addition, although Japanese Unexamined Patent Application Publication Nos. 2008-99158 or 2008-227697 discloses the process of acquiring two types of images including a long time exposure image and a short time exposure image, in the invention, processes may be performed based on four types of images having different exposure times.

As described above, the plurality of the images having different exposure amounts are the images that are photographed at the timings different in terms of time. Therefore, if a motion of the subject occurs during the time, there are differences in the images at the time of combining the images. As a result, occurrence of pseudo color in an image area of the moving results in a problem of deterioration of the image quality or the like.

The image processing unit 104 performs a process of determining an image area, in which a motion of the subject is estimated to have occurred, before performing the process of combining the images input from the imaging device 102. A correction process is performed on the pixel area which is determined to be a motion area by the motion determination process, and after that, a combined image is generated. Hereinafter, a detailed embodiment of a process of detecting the motion image area by using the plurality of the images having different exposure times is described.

2. Detailed Embodiments of Image Processing Apparatus

Hereinafter, detailed embodiments of a configuration and a process of the image processing apparatus illustrated in FIG. 3 are described.

(2-1) First Embodiment

Figure 4:
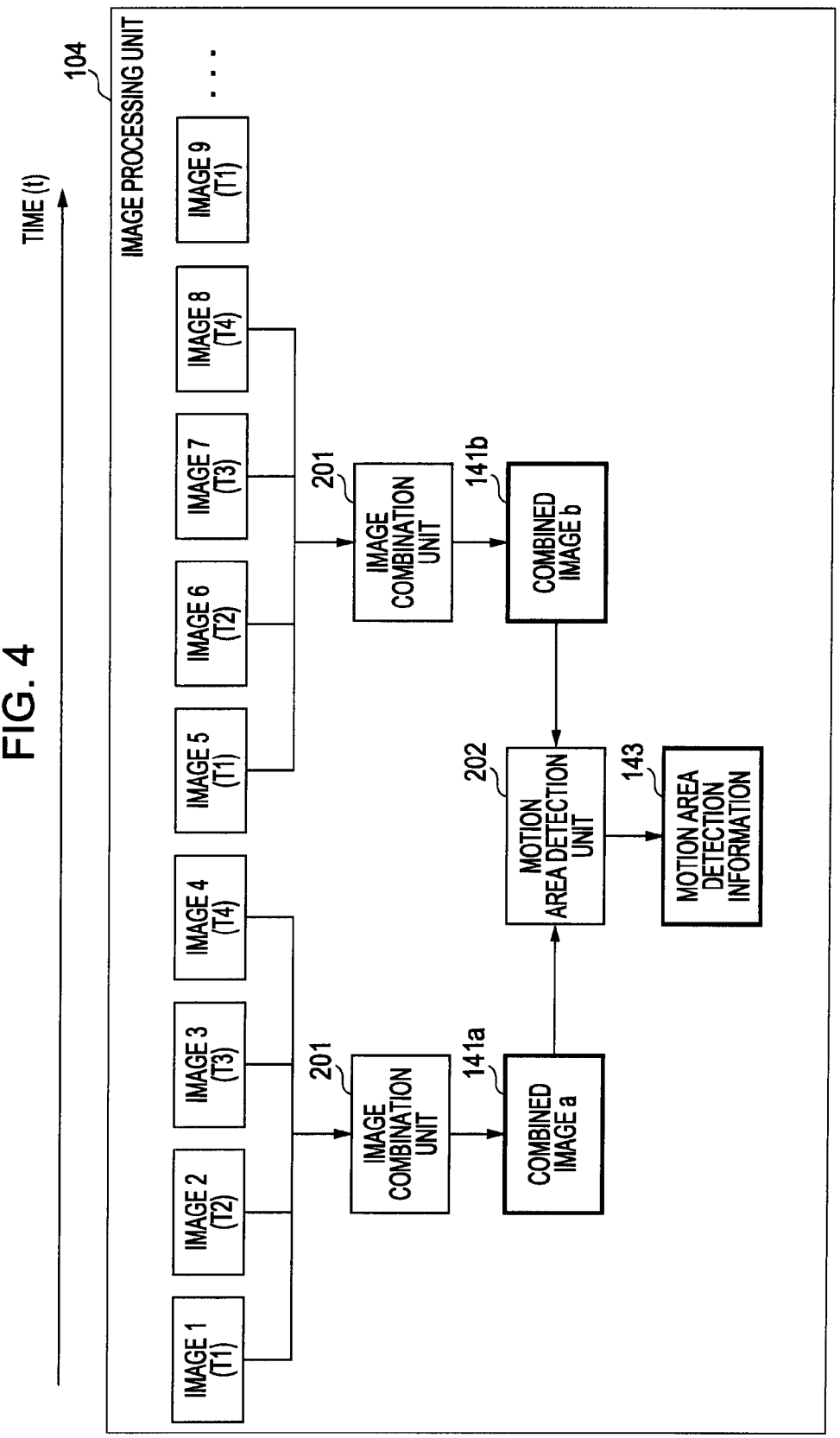
FIG. 4 is a diagram illustrating a process of an image processing unit 104 of an image processing apparatus according to a first embodiment of the invention.

FIG. 4 is a diagram illustrating a process of an image processing unit 104 of an image processing apparatus according to a first embodiment of the invention. The process proceeds as time elapses in the direction of from the left to the right along the time axis (t) illustrated in the upper portion. In other words, as time elapses, the images including Image 1 of the exposure time (T1), Image 2 of the exposure time (T2), Image 3 of the exposure time (T3), Image 4 of the exposure time (T4) . . . are sequentially input and processed.

The image processing unit 104 sequentially inputs four images having different exposure times including Image 1 of the exposure time (T1), Image 2 of the exposure time (T2), Image 3 of the exposure time (T3), and Image 4 of the exposure time (T4) acquired by the imaging device 102. Next, similarly, the image processing unit 104 sequentially inputs four images having different exposure times including Image 5 of the exposure time (T1), Image 6 of the exposure time (T2), Image 7 of the exposure time (T3), and Image 8 of the exposure time (T4). Hereinafter, the same processes are repeated. In addition, the exposure times T1 to T4 satisfy T1<T2<T3<T4.

Figure 1:
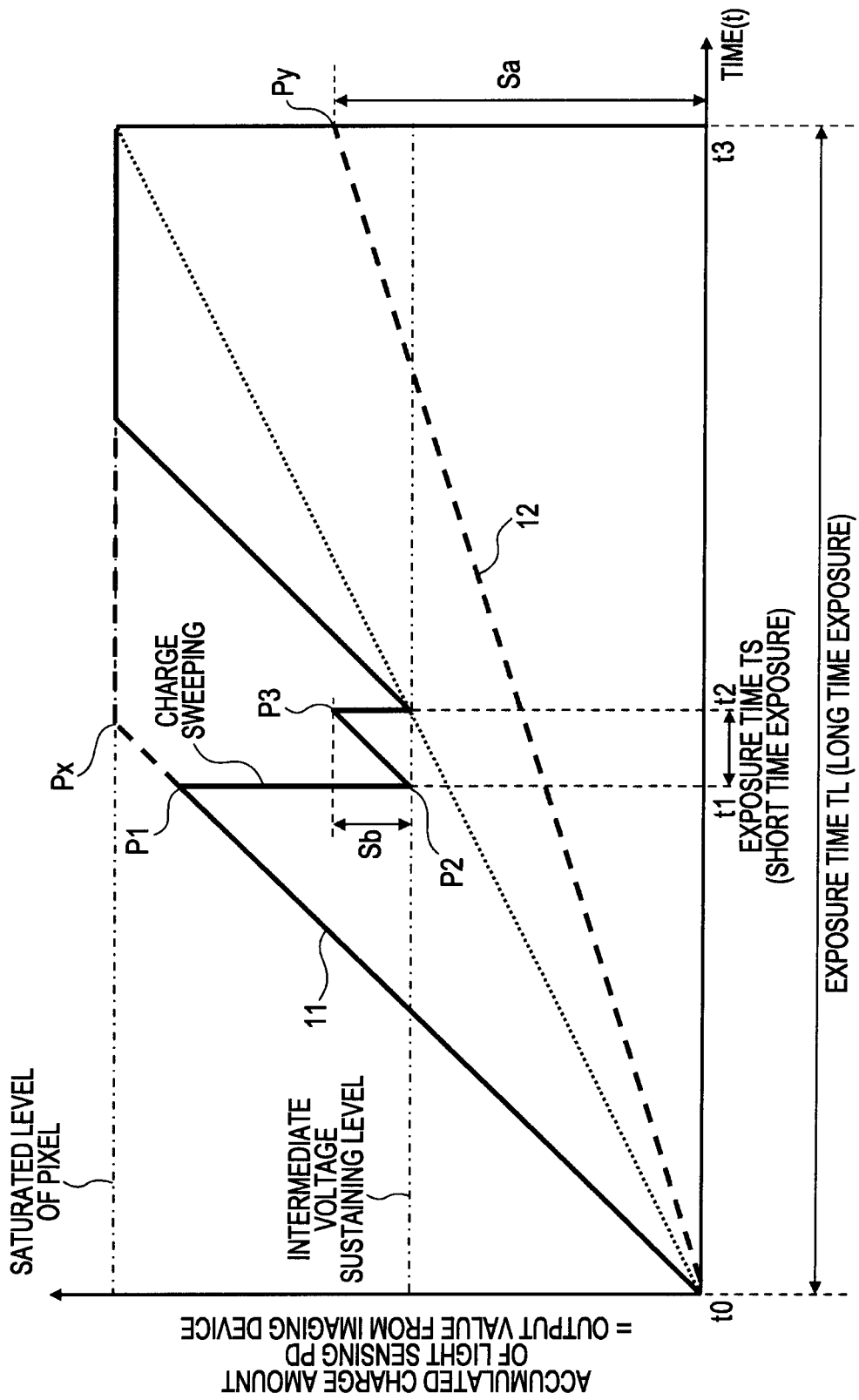
FIG. 1 is a diagram illustrating a process of obtaining an image having a wide dynamic range by combining a plurality of images having different exposure amounts.
Figure 5:
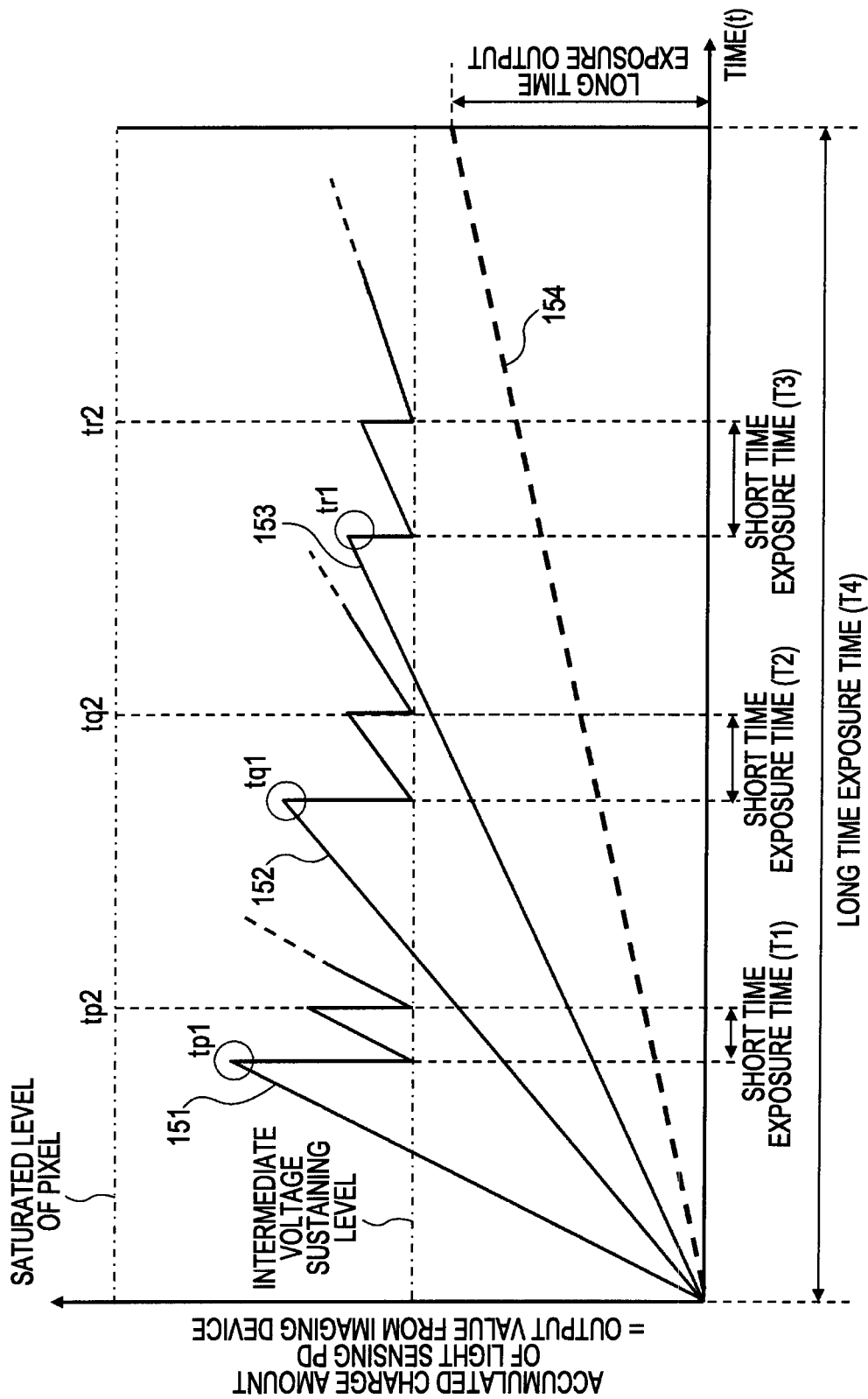
FIG. 5 is a diagram illustrating an example of a combination process of generating one image having a wide dynamic range by combining four images having exposure times T1 to T4.

The image processing unit 104 composes one image having a wide dynamic range by using four images having the exposure times T1 to T4 if necessary. An example of the combination process is described with reference to FIG. 5. FIG. 5 is different from FIG. 1 in that four types of the exposure times are used except that the acquisition of the two images of the long time exposure image and the short time exposure image and the combination process are basically the same as those of FIG. 1.

In FIG. 5, the horizontal axis is a time (t), and the vertical axis is an accumulated charge amount (e) in a light sensing photodiode (PD) constituting a photoelectric conversion element corresponding to one pixel of a solid-state imaging device which constitutes the imaging device 102. For example, in the case where a sensed light amount of the light sensing photodiode (PD) is large, that is, in the case corresponding to a bright subject, as illustrated in an ultra-high luminance area 151 in FIG. 5, the charge accumulation amount is rapidly increased as time elapses. On the other hand, in the case where the sensed light amount of the light sensing photodiode (PD) is small, that is, in the case corresponding to a dark subject, as illustrated in a low luminance area 154 in FIG. 5, the charge accumulation amount is gradually increased as time elapses. There is a bright subject between a high luminance area 152 and a medium luminance area 153. In other words, the order of the brightness of the subject is as follows.

Ultra-High Luminance Area 151>High Luminance Area 152>Medium Luminance Area 153>Low Luminance Area 154

At a pixel in the low luminance area 154, although the exposure is performed for the longest exposure time (T4), the charge accumulation amount does not reach the saturated level. Therefore, it is possible to obtain an accurate grayscale expression by the grayscale level of the pixel which id determined by using the [long time exposure output] signal illustrated in the right end of the figure, which is obtained based on the charge accumulation amount after the exposure time (T4) elapses.

However, with respect to the line illustrated in the ultra-high luminance area 151, the high luminance area 152, and the medium luminance area 153, there is a high possibility that, before the longest exposure time (T4), the charge accumulation amount already reaches the saturated level. Therefore, in such a pixel area, only the pixel value corresponding to the electrical signal having the saturated level is obtained from the long time exposure image, so that the whited-out pixel is formed.

Therefore, in the pixels corresponding to a range of from the ultra-high luminance area 151 to the medium luminance area 153, first, at each of the predetermined timings (tp1, tq1, and tr1), the accumulated charges in the light sensing photodiode (PD) are swept out. The charge sweeping is not performed on all the charges accumulated in the light sensing photodiode (PD), but it is performed to the intermediate voltage sustaining level controlled in the photodiode (PD). After the charge sweeping process, the exposure process is performed again with the exposure time (T1=tp1 to tp2), the exposure time (T2=tq1 to tq2), and the exposure time (T3=tr1 to tr2). In other words, as illustrated in the figure, the short time exposure with the short time exposure time (T1), the short time exposure time (T2), and the short time exposure time (T3) is performed.

In this manner, the charge accumulation amounts corresponding to the plurality of the different exposure times T1 to T4 (T1<T2<T3<T4) is obtained by the exposure times, and the grayscale levels of the pixels are determined based on the electrical signals, which are obtained based on the charge accumulation amounts. In addition, when the pixel value is to be determined based on an electrical signal obtained based on the charge accumulation amount obtained according to each exposure time, an estimated charge accumulation amount in the case of performing the equal-time exposure or an electrical signal output value corresponding to the estimated charge accumulation amount is calculated, and the pixel value level is determined based on the result of the calculation. In this manner, by combining the short time exposure image and the long time exposure image, it is possible to obtain an image having a wide dynamic range, where there is no white-out.

In addition, the exposure times T1 to T4 may be set, for example, as T4=1/30 sec, T3=1/300 sec, T2=1/3000 sec, and T1=1/30000 sec. For example, in such a setting of T1 to T4, if the output image 120 illustrated in FIG. 3 is generated as a combined image of the four images having the exposure times T1 to T4, in the case where the output image 120 is a moving picture, the moving pictures corresponding to 30 fps can be sequentially generated.

This is because a combined image may be generated based on the images in a range of from the exposure image where (ultra-high luminance pixel)=(exposure time T1) to the exposure image where (low luminance pixel)=(exposure time T4) every T4=1/30 sec.

However, the plurality of the image having different exposure amounts, that is, the exposure times T1 to T4 are the images that are photographed at the timings different in terms of time. Therefore, if a motion of the subject occurs during the time, there are differences in the images at the time of combining the images. As a result, occurrence of pseudo color in an image area of the moving subject area results in a problem of deterioration in the image quality or the like.

The image processing unit 104 of the image processing apparatus 100 according to the invention identifies an image area of the moving subject in order to solve the problem. In addition, hereinafter, the subject which moves is referred to as a "moving subject", and the captured image area of the moving subject is referred to as a "motion area".

As illustrated in FIG. 4, the image processing unit 104 according the embodiment identifies the motion area by using a plurality of after-combination images.

As illustrated in FIG. 4, the image processing unit 104 includes an image combination unit 201 and a motion area detection unit 202. In addition, although the two image combination units 201 are illustrated in FIG. 4, this illustration denotes that the process of combining Images 1 to 4 is formerly performed and, after that, the process of combining Images 5 to 8 is performed. Therefore, this illustration denotes that one image combination unit 201 sequentially performs the processes. In other words, a plurality of the image combination units may not be necessary, but the only one image combination unit 201 may be sufficient.

The motion area detection unit 202 compares the two combined images generated by the image combination unit 201 to determine a motion area. In other words, the two combined images are as follows.

Combined image a, 141a generated by the process of combining Images 1 to 4

Combined image b, 141b generated by the process of combining Images 2 to 5

The motion area detection unit 202 compares the sequentially-generated two combined images and detects a motion area included in the images. The detection result is output as motion area detection information 143.

The motion area detection unit 202 compares the pixel values between the after-combination images. In the case where the subject does not move, the pixel values at the same coordinates are coincident with each other. In other words, the high luminance pixels at the coordinates where the combined image a, 141a exists are the same as the high luminance pixels at the corresponding coordinates of the combined image b, 141b, and the low luminance pixels of the combined image a, 141a are the same as the low luminance pixels of the combined image b, 141b. The correspondence relationship between the pixel values is illustrated in FIG. 6.

Figure 6:
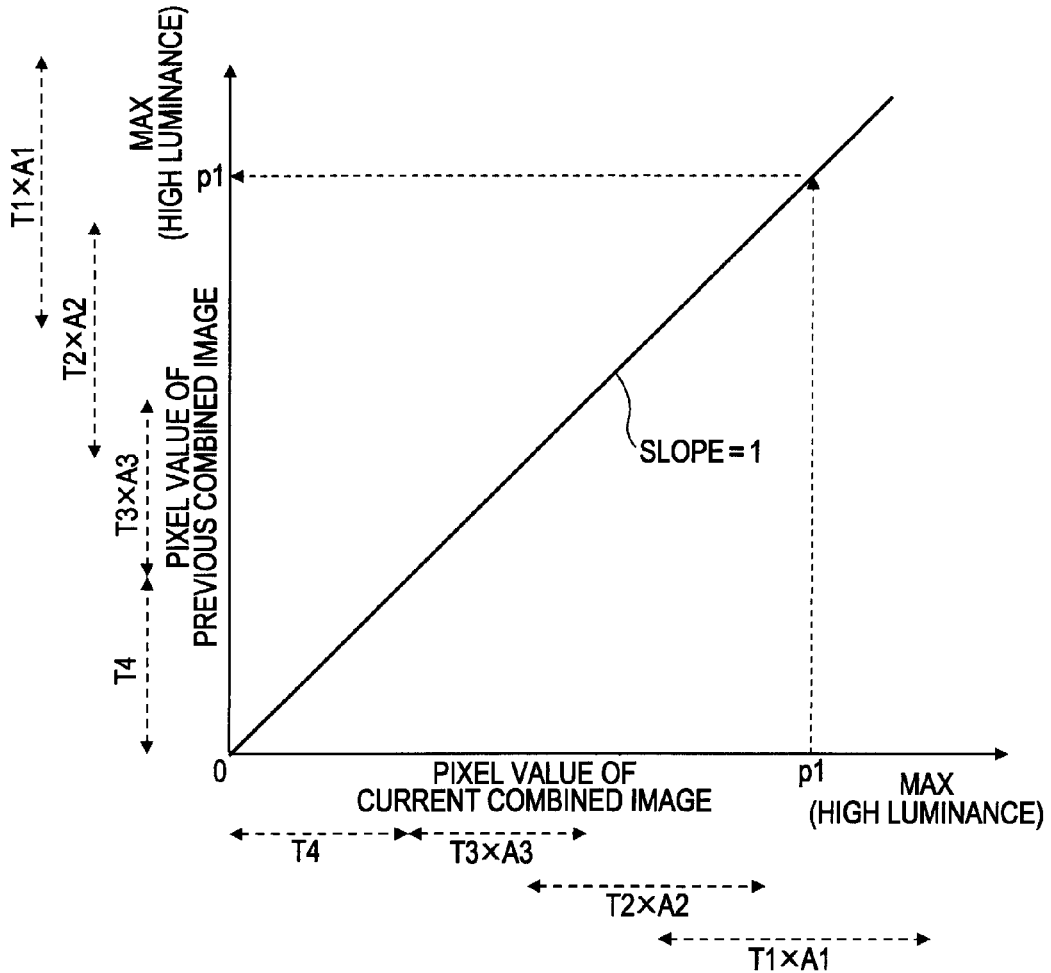
FIG. 6 is a diagram illustrating a correspondence relationship between pixel values of combined images.

In FIG. 6, the horizontal axis represents the pixel value (0 to MAX) of the current combined image (combined image b, 141b), and the vertical axis represents the pixel value (0 to MAX) of the previous combined image (combined image a, 141a). For example, in the case where the pixel value at the coordinate (x1, y1) where the current combined image (combined image b, 141b) is located is p1, the pixel value at the same coordinate of the previous combined image (combined image a, 141a) is also p1. In other words, in the case where the subject does not move, the pixel values at the same coordinate are coincident with each other, so that the pixel values may sit on the straight line having a slope of 1 illustrated in the figure.

In addition, as illustrated in FIG. 6, any one of the current combined image (combined image b, 141b) and the previous combined image (combined image a, 141a) is an image generated by a process of combining the images having different exposure times, that is, the exposure times T1 to T4. In other words, the pixels values in the pixel area as the high luminance area are determined based on the image having the short exposure time T1, and the pixel values in the pixel area as the low luminance area are determined based on the image having the long exposure time T4, so that any one of the current and previous combined images is the combined images generated by the process of combining a plurality of the images having exposure times (T1 to T4).

As illustrated in FIG. 6, exposure ratios of the images having the exposure times T1 to T4 are as follows.

A1: an exposure ratio of T4 to T1 (T4/T1)
A2: an exposure ratio of T4 to T1 (T4/T2)
A3: an exposure ratio of T4 to T1 (T4/T3)

For example, as illustrated in FIG. 6, the output pixel value is determined by a process of multiplication of the exposure ratios A1 to A3 and each of the output signals of the images having the exposure times T1 to T4. In other words, the pixel value in the low luminance area is determined based on the image having the exposure time T4; the pixel value in the medium luminance area is determined based on the image having the exposure time T3; the pixel value in the high luminance area is determined based on the image having the exposure time T2; and the pixel value in the ultra-high luminance area is determined based on the image having the exposure time T1.

The combining methods are processes that are the same in the current combined image (combined image b, 141b) and the previous combined image (combined image a, 141a). In the case where the subject does not move, the pixel values at the same coordinate are coincident with each other, so that the pixel values may sit on the line having a slope of 1 illustrated in FIG. 6.

The image processing unit 104 according to the first embodiment detects the motion area by using the correlation between the combined images. The process is described with reference to FIG. 7.

Figure 7:
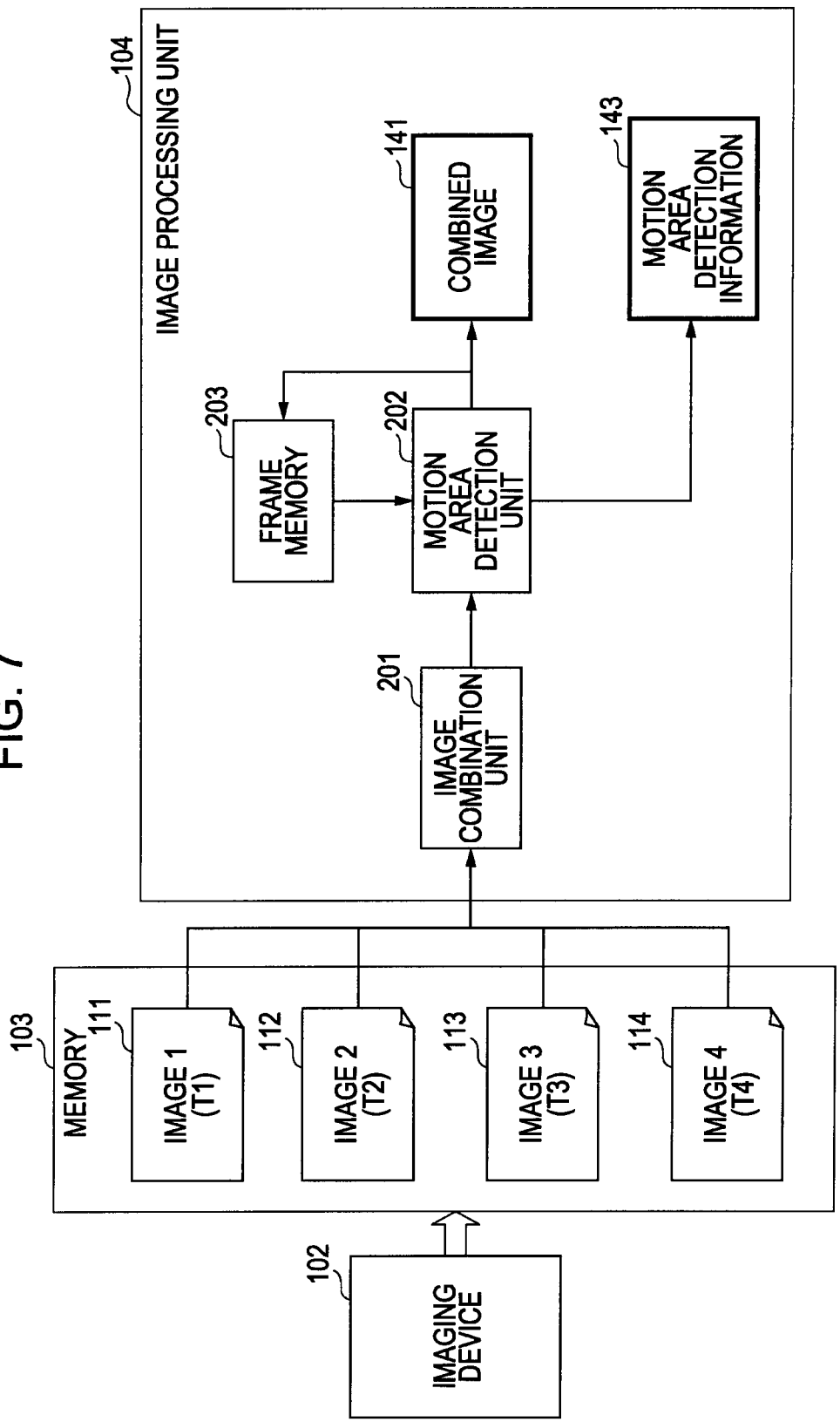
FIG. 7 is a diagram illustrating a process of detecting a motion area by using a correlation between combined images.

FIG. 7 is a block diagram illustrating processes of the image processing unit 104 according to the first embodiment. The imaging device 102 outputs images 111 to 114 (exposure time=T1 to T4) and stores the images in the memory 103.

The image processing unit 104 inputs the images 111 to 114 (exposure time=T1 to T4) and allows the image combination unit 201 to perform the image combining process to generate the combined image. As illustrated above in FIG. 6, the image combination unit 201 combines the images having different exposure times according to the luminance to generate the combined image where the whited-out pixels having the saturated pixel values are removed. In addition, as described above with reference to FIG. 4, the image combination unit 201 sequentially generates the combined images by using four images having four types of different exposure times as one set.

The combined images generated by the image combination unit 201 are input to the motion area detection unit 202. For example, in the case where a combined image a generated from four images and a combined image b generated from next four images are consecutively input, the motion area detection unit 202 passes the combined image a that is formerly input and stores the combined image a together with an output (combined image 141) in a frame memory 203.

If the latter combined image b generated from the four images is input from the image combination unit 201, the motion area detection unit 202 reads the former combined image a from the frame memory 203 and compares the former combined image a with the latter combined image b input from the image combination unit 201.

The motion area detection unit 202 compares the pixel values of the combined image a and the combined image b. In other words, the pixel value comparison is performed on each of the corresponding positions of the same pixel. In the case where no motion occurs in the subject, as described with reference to FIG. 6, ideally, the pixel values at the coordinates corresponding to the combined image a and the combined image b sit on the line having a slope of 1 illustrated in FIG. 6.

If the pixel values at the coordinate positions corresponding to the combined image a and the combined image b sit on the line having a slope of 1 illustrated in FIG. 6, it is determined that the subject is stationary. If the pixel values deviate from the line having a slope of 1 illustrated in FIG. 6, it is determined that there is a motion area.

However, in the actual case, although the subject is stationary, due to the influence of the noise of the solid-state imaging device or the shot noise of light, there is not much possibility that the output values are completely coincident with each other. Therefore, some degree of allowance may have to be set at the time of comparison. For example, an allowable value [Th1] for a difference in the pixel value is set. If the pixel value difference at the same coordinate position of the combined image a and the combined image b is within the allowable difference value [Th1], it is determined that the subject is stationary. If the pixel value difference at the same coordinate position of the combined image a and the combined image b exceeds the allowable difference value [Th1], it is determined that there is a motion area.

More specifically, for example, the allowable difference value [Th1] is set to 10% of the pixel value (output value of the current combined image (the latter combined image b)), that is, allowable difference value [Th1]=10%. In this case, an area where the pixel value difference at the same coordinate position of the combined image a and the combined image b exceeds 10% of the pixel value is determined to be a motion area, that is, a photographed area of the moving subject. The motion area detection unit 202 determines whether or not to be a motion area in units of pixel by using, for example, the following determination formula (Formula 1).

(Current Combined Image Output Value)×0.1<|(Current Combined Image Output Value)−(Previous Combined Image Output Value)|     (Formula 1)

In addition, in the above formula, allowable difference value [Th1]=0.1 (10% of the pixel value), but it is an example. Since the allowable amount depends on, for example, performance of the solid-state imaging device, it is preferable that the allowable amount is determined according to the performance or the like of the employed solid-state imaging device.

The motion area detection unit 202 determines the pixel, which satisfies, for example, the aforementioned formula (Formula 1), to be a motion area and the pixel, which does not satisfy the aforementioned formula, as a non-motion area.

The motion area detection unit 202 outputs information of determining the motion area pixel and the non-motion area pixel as motion area detection information 143. The motion area detection information 143 is configured with motion area detection information or the like corresponding to pixels, wherein, for example, motion area pixel=1 and non-motion area pixel=0 are set in units of pixel of an image.

In addition, in the above process, the combined image which is subjected to the comparison process may be a before-camera signal process image, for example, a before-de-mosaicing-process image or an after-camera signal process image.

In addition, as the solid-state imaging device included in the imaging device, for example, in addition to the imaging device having the configuration of the aforementioned Japanese Unexamined Patent Application Publication No. 2008-99158, a general solid-state imaging device, more specifically, a solid-state imaging device such as a general CCD image sensor or CMOS (Complementary Metal Oxide Semiconductor) image sensor may be employed.

(2-2) Second Embodiment

Figure 8:
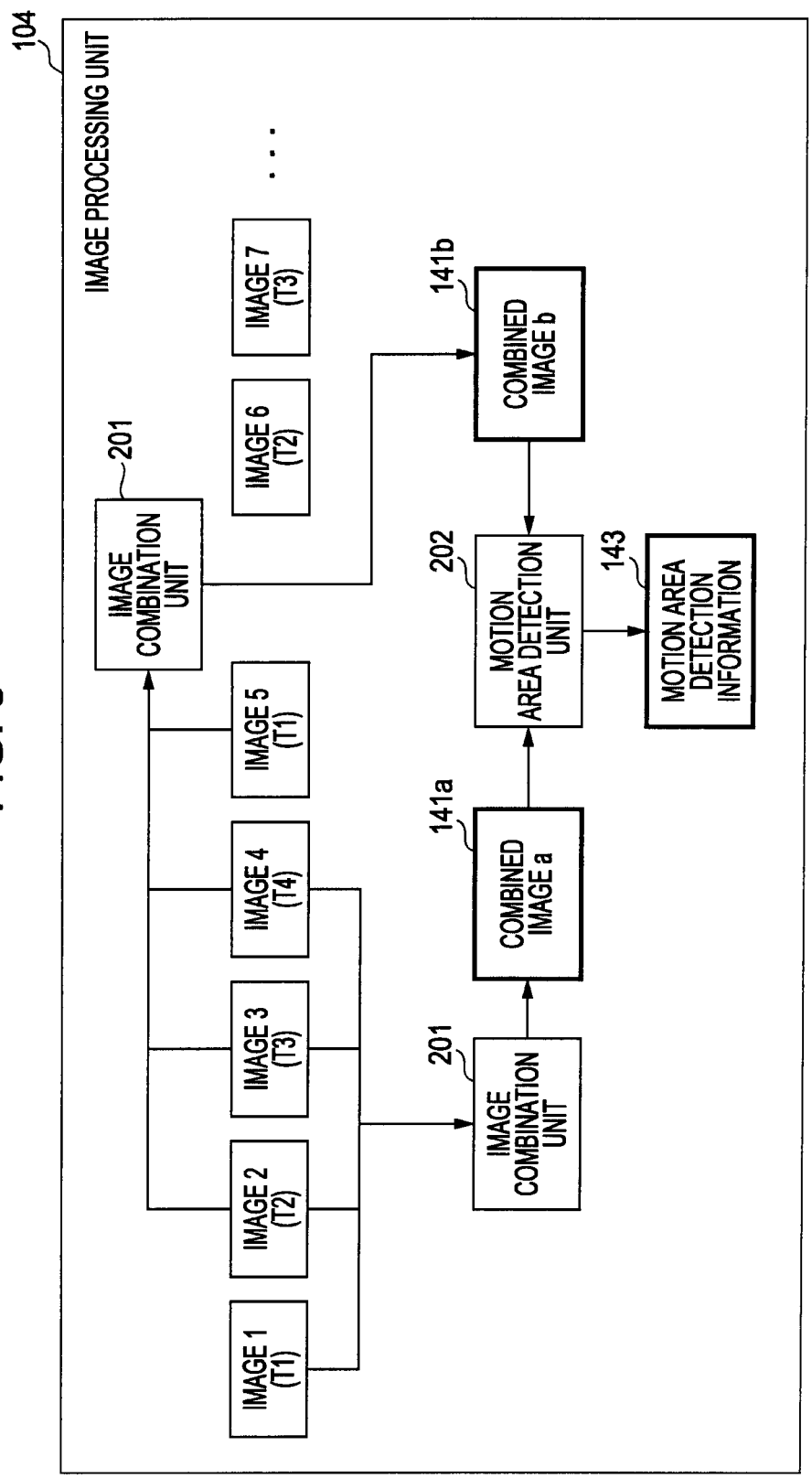
FIG. 8 is a diagram illustrating an image process executed by an image processing apparatus according to a second embodiment.

FIG. 8 is a diagram illustrating a concept of an image process according to a second embodiment. As time elapses, the images including Image 1 of the exposure time (T1), Image 2 of the exposure time (T2), Image 3 of the exposure time (T3), Image 4 of the exposure time (T4) . . . are sequentially input and processed.

The embodiment is different from the first embodiment in terms of the method of selecting an image used for combination. Unlike the first embodiment, the combination is performed when one to-be-combined image (image n) is output.

The image combination unit 201 performs the image combining process as follows.

The combined image a, 141*a* is generated by the image combining process employing the plurality of the images including Image 1 to Image 4 having different exposure times T1 to T4 (T1<T2<T3<T4).

Next, the combined image b, 141*b* is generated by the image combining process employing the plurality of the images including Image 2 to Image 5 having different exposure times T1 to T4 (T1<T2<T3<T4).

Next, the same processes are repeated. As a result, the process of combining the four images including Images n to n+3 is performed and, after that, the process of combining the four images including Images (n+1) to (n+4) is performed, so that the combined images are sequentially generated by combining the four images which are shifted by one image.

The motion area detection unit 202 compares the two combined images generated by the image combination unit 201 to determine a motion area. In other words, the two combined images are as follows.

Combined image a, 141*a* generated by the process of combining Images 1 to 4

Combined image b, 141*b* generated by the process of combining Images 5 to 8

The motion area detection unit 202 compares the sequentially-generated two combined images and detects a motion area included in the images.

The motion area detection unit 202 compares the sequentially-generated two combined images and detects a motion area included in the images. The detection result is output as motion area detection information 143.

The process of the motion area detection unit 202 is the same as that of the first embodiment. In other words, in the case where the subject does not move in the current combined image (combined image b, 141*b*) and the previous combined image (combined image a, 141*a*), the pixel values at the same coordinate are coincident with each other, so that the pixel values may sit on the line having a slope of 1 illustrated in FIG. 6.

If the pixel values at the coordinate positions corresponding to the combined image a and the combined image b sit on the line having a slope of 1 illustrated in FIG. 6, it is determined that the subject is stationary. If the pixel values deviate from the line having a slope of 1 illustrated in FIG. 6, it is determined that there is a motion area. However, it is preferable that a process of determining the pixel area, where a pixel value difference equal to or larger than the allowable difference value [Th1] is detected by using the allowable difference value [Th1] determined according to performance or the like of the employed solid-state imaging device as described with reference to the aforementioned formula (Formula 1), to be a motion area is performed.

The motion area detection unit 202 outputs information determining the motion area pixel and the non-motion area pixel as motion area detection information 143. The motion area detection information 143 is configured with motion area detection information or the like corresponding to pixels, wherein, for example, motion area pixel=1 and non-motion area pixel=0 are set in units of pixel of an image.

In the process of the second embodiment illustrated in FIG. 8, in comparison with the first embodiment described with reference to FIG. 4, since the time interval between the combined images is short, the motion distance of the moving subject may be allowed to be shortened. However, the image processing performed in the image processing apparatus may have to be performed at a high speed. For example, a process of combining and outputting images at an output rate equal to an input rate of images may have to be provided.

Figure 9:
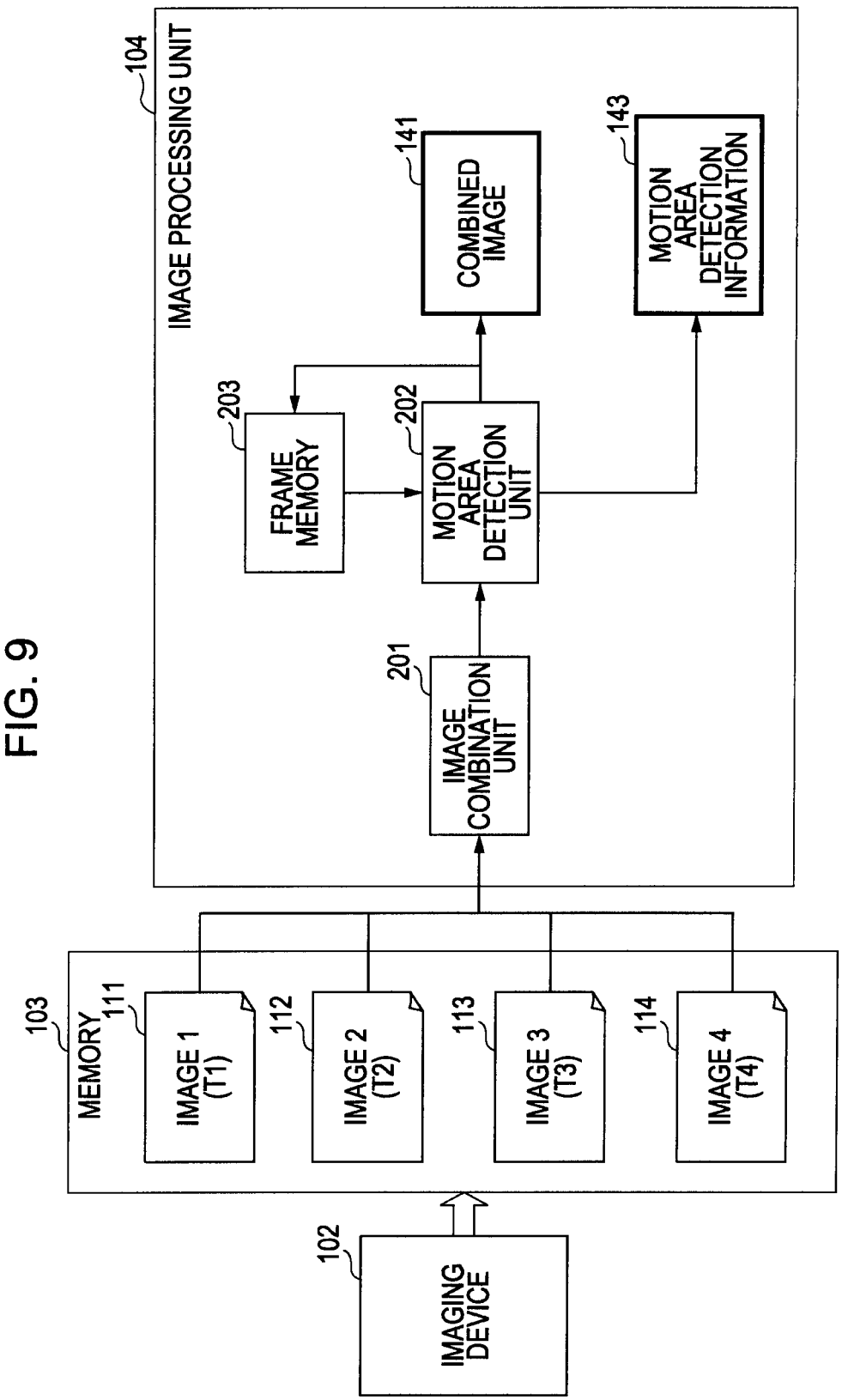
FIG. 9 is a block diagram illustrating a process of the image processing apparatus according to the second embodiment.
Figure 10:
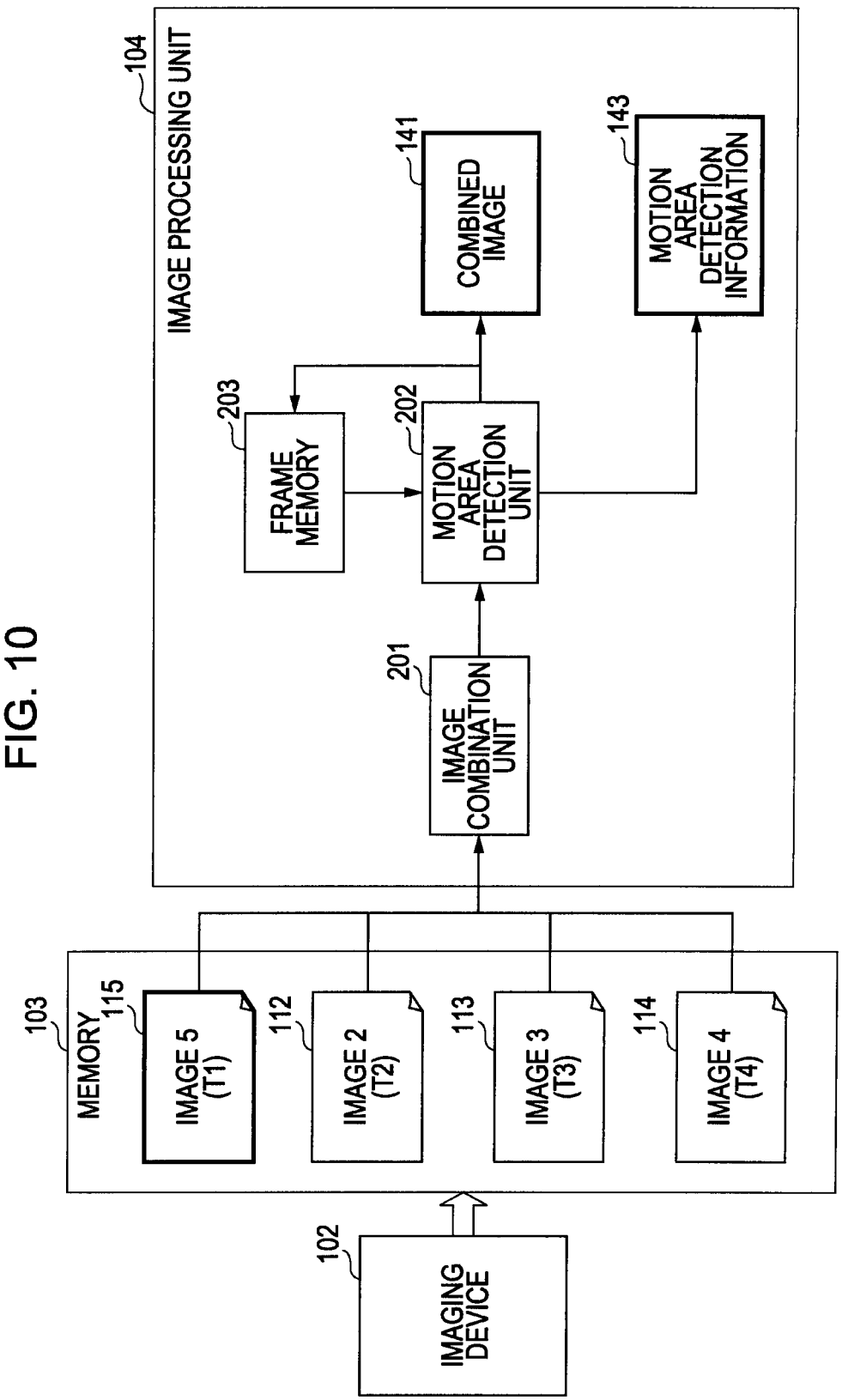
FIG. 10 is a block diagram illustrating a process of the image processing apparatus according to the second embodiment.

FIGS. 9 and 10 are block diagrams illustrating the processes of the image processing unit 104 according to the embodiment. First, the processes of the embodiment are described with reference to FIGS. 9 and 10. First, as illustrated in FIG. 9, the imaging device 102 outputs the images 111 to 114 (exposure time=T1 to T4) and stores the images in the memory 103.

The image processing unit 104 is input with these images 111 to 114 (exposure time=T1 to T4) and allows the image combination unit 201 to perform the image combining process and to generate the combined image. As described above with reference to FIG. 6, the image combination unit 201 generates the combined image, where the whited-out pixel having the saturated pixel value is removed, by combining the images having different exposure times according to the luminance. In addition, as described above with reference to FIG. 8, the image combination unit 201 sequentially generates the combined images by using four images having four types of different exposure times as one set in units of a set of four images shifted by one image.

FIG. 9 is a diagram illustrating an example of timings of storing images including Image 1, 111 to Image 4, 114 into the memory 103 and generating a combined image a, 141*a* (refer to FIG. 8) by a process of combining images including Image 1 to Image 4.

FIG. 10 is a diagram illustrating an example of timings of inputting the next image 5, 115 into the memory 103 and generating a combined image b, 141*b* (refer to FIG. 8) by a process of combining images including Image 2, 112 to Image 5, 115 stored in the memory 103.

The combined image generated by the image combination unit 201 is input to the motion area detection unit 202. For example, in the case where a combined image a generated from four images (Image 1 to Image 4) and a combined image b generated from the next four images (Image 2 to Image 5) are sequentially input, the motion area detection unit 202 passes the combined image a that is formerly input and stores the combined image a together with an output (combined image 141) in the frame memory 203.

If the latter combined image b generated from the four images is input from the image combination unit 201, the motion area detection unit 202 reads the former combined image a from the frame memory 203 and compares the former combined image a with the latter combined image b input from the image combination unit 201.

The motion area detection unit 202 performs pixel value comparison between the combined image a and the combined image b. In other words, the motion area detection unit 202 performs the pixel value comparison at the same corresponding pixel positions. In the case where no motion occurs in the subject, as described with reference to FIG. 6, ideally, the pixel values at the coordinates corresponding to the combined image a and the combined image b sit on the line having a slope of 1 illustrated in FIG. 6.

If the pixel values at the coordinate positions corresponding to the combined image a and the combined image b sit on the line having a slope of 1 illustrated in FIG. 6, it is determined that the subject is stationary. If the pixel values deviate from the line having a slope of 1 illustrated in FIG. 6, it is determined that there is a motion area. However, as described with reference to the aforementioned formula (Formula 1), it is preferable to perform a process of determining a pixel area, where a pixel value difference equal to or larger than an allowable difference value [Th1] determined according to performance or the like of the employed solid-state imaging device is detected, to be a motion area by using the allowable difference value [Th1].

The motion area detection unit 202 determines the pixel, which satisfies, for example, the aforementioned formula (Formula 1), to be a motion area and the pixel, which does not satisfy the aforementioned formula, as a non-motion area.

The motion area detection unit 202 outputs information of determining the motion area pixel and the non-motion area pixel as motion area detection information 143. The motion area detection information 143 is configured with, for example, pixel-corresponding motion area detection information or the like, in which motion area pixel=1 and non-motion area pixel=0 in units of a pixel of the image.

In the embodiment, in addition to the imaging device having the configuration of the aforementioned Japanese Unexamined Patent Application Publication No. 2008-99158, a general solid-state imaging device, more specifically, a solid-state imaging device such as a general CCD image sensor or CMOS (Complementary Metal Oxide Semiconductor) image sensor may be employed.

(2-3) Third Embodiment

As described with reference to FIG. 4 or the like, the above-described process according to the first embodiment is a process of generating combined images in units of a set of four images without overlap by using the four images having exposure times T1 to T4 as one set and comparing the combined images to detect a motion area.

Although the process according to the first embodiment is very simple, photographing times of the two combined images as the objects of the pixel value comparison is separated with an interval. In this manner, if the combined images as the objects of the comparison are separated with a time interval, for example, there is a high possibility that even a moving subject with slow motion may be determined to be a motion area.

In this manner, if the two combined images as the objects of the comparison is separated with a time interval, even in a pixel area where a pixel value difference is detected by the pixel value comparison process between the combined images and which is determined to be a motion area, a pixel value difference of the corresponding pixels between the plurality of the difference exposure images as combination sources of a one combined image may be small, and the area may be determined to be a motion area by the difference. This is because the photographing time interval between the different exposure images constituting the combined images is smaller than the photographing time interval between the combined images.

In this way, since in the first embodiment the photographing time interval between the combined images that are subjected to the pixel value comparison is large, the detection of the motion area tends to be excessive. The third embodiment is an example of a configuration including a method of removing such over-detection.

Figure 11:
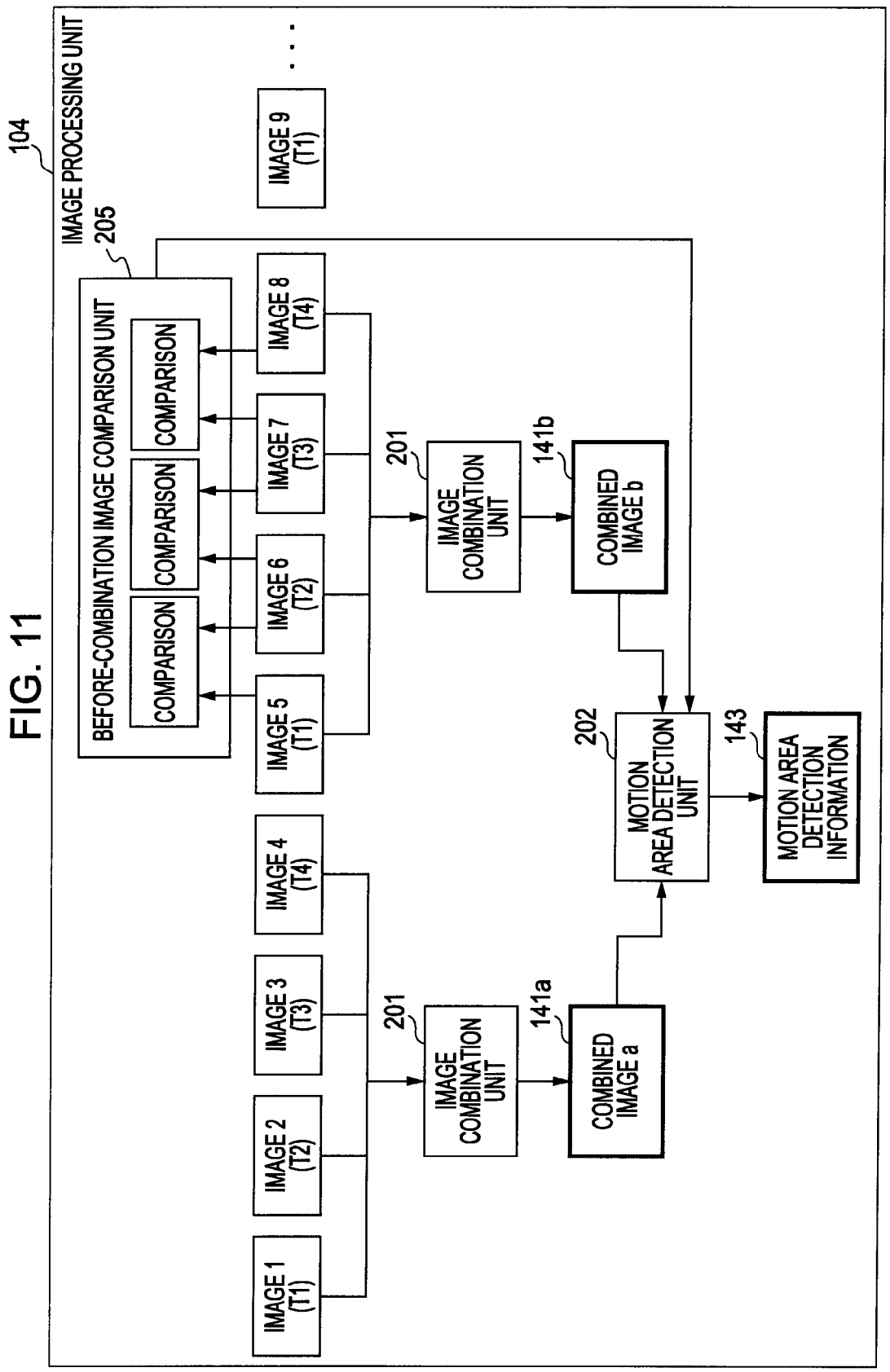
FIG. 11 is a diagram illustrating an image process executed by an image processing apparatus according to a third embodiment.

FIG. 11 is a diagram illustrating a concept of an image process according to the third embodiment. As time elapses, the images including Image 1 of the exposure time (T1), Image 2 of the exposure time (T2), Image 3 of the exposure time (T3), Image 4 of the exposure time (T4) . . . are sequentially input and processed.

A combination of the images for generating the combined image is the same as that of the first embodiment described with reference to FIG. 4. In other words, the combined image a, 141a is generated by the image combining process employing the plurality of the images including Image 1 to Image 4 having different exposure times T1 to T4 (T1<T2<T3<T4).

Next, the combined image b, 141b is generated by the image combining process employing the images including Image 2 to Image 5 having different exposure times T1 to T4 (T1<T2<T3<T4).

The embodiment is different from the first embodiment described with reference to FIG. 4 in that a before-combination image comparison unit 205 is included. The before-combination image comparison unit 205 compares output values between pixels of the before-combination to-be-combined images (images n) and the result of the comparison to the motion area detection unit 202.

The motion area detection unit 202 performs re-verification of the area which is determined to be the motion area in the pixel value comparison between combined images by using the information on the result of the pixel value comparison between the pixels of the before-combination to-be-combined images (images n) input from the before-combination image comparison unit 205. In the case where the result of the pixel value comparison between the pixels of the before-combination to-be-combined images (images n) is equal to or less than a predetermined pixel value difference, the area which is determined to be a motion area in the pixel value comparison between the combined images is determined not to be a motion area. In other words, the motion area detection unit 202 performs a process of removing the portion that is excessively determined to be a motion area in the pixel value comparison between the combined images.

The before-combination image comparison unit 205 performs the pixel value comparison of the corresponding pixels of the before-combination to-be-combined images, that is, the images having different exposure times T1 to T4 (T1<T2<T3<T4). In this case, the comparison between output pixel values calculated based on the exposure times may have to be performed.

The process corresponds to the process of Japanese Unexamined Patent Application Publication No. 2000-50151 described above in Description of the Related Art, that is, the correspondence relationship comparison process between the output value (luminance) of the long time exposure image (LE) and the output value (luminance) of the short time exposure image (SE) described above with reference to FIG. 2. In other words, if the output value (luminance) of the long time exposure image (LE) and the output value (luminance) of the short time exposure image (SE) are set on the line having a slope A (=exposure ratio) illustrated in FIG. 2, it may be determined that the corresponding pixels of the long time exposure image (LE) and the short time exposure image (SE) are associated with the photographing of the subjects having completely the same luminance.

Figure 2:
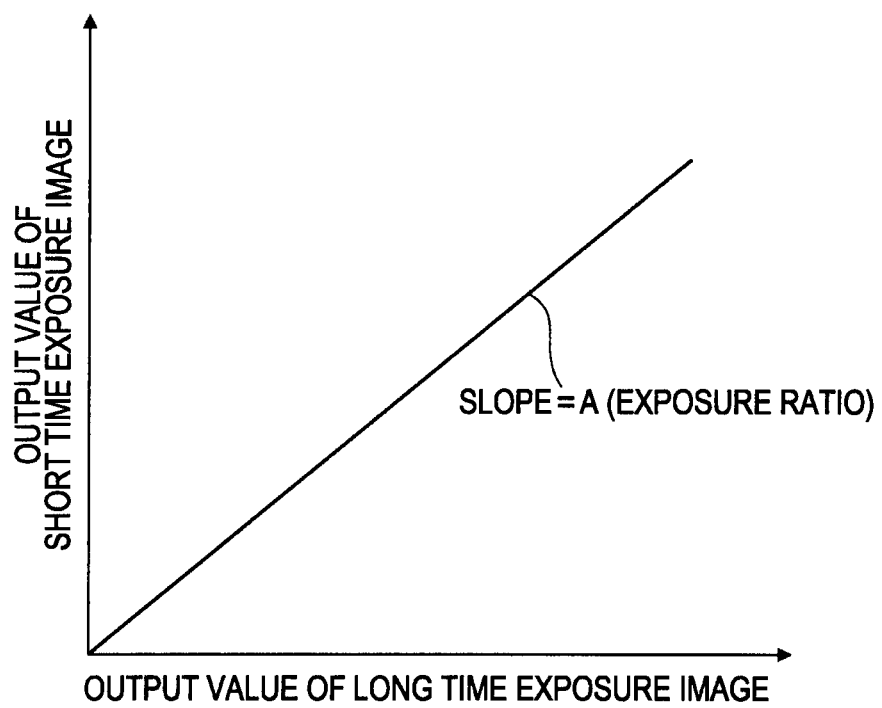
FIG. 2 is a diagram illustrating a correspondence relationship between an output value (luminance) of a long time exposure image (LE) and an output value (luminance) of a short time exposure image (SE).

In other words, in the case where the same subject is photographed, the correspondence relationship between the output value (luminance) of the long time exposure image (LE) and the output value (luminance) of the short time exposure image (SE) are set to be on the line having a slope A (=exposure ratio) as illustrated in FIG. 2. Therefore, an area deviated from the line is determined to be an area where a motion occurs.

However, as described above, in an actual case, since there is a variation in the special products of a PD or a transistor constituting the imaging device, it is difficult to accurately determine based on the satisfaction or otherwise of (LE−SE×A)=0 whether or not there is motion of the subject. For example, a little variation between the devices can be reduced by setting a threshold value (Th) and determining whether or not |LE−SE×A|<Th is satisfied. However, since the variation between the devices is varied according to the apparatuses, there is a problem in that it is difficult to set an optimum threshold value.

In the embodiment, a method of solving the problem in the comparison of the images having different exposure times is used. The output value of the long time exposure image and the output value of the short time exposure image show characteristics illustrated in FIG. 12 according to, for example, the characteristics of the imaging device.

Figure 12:
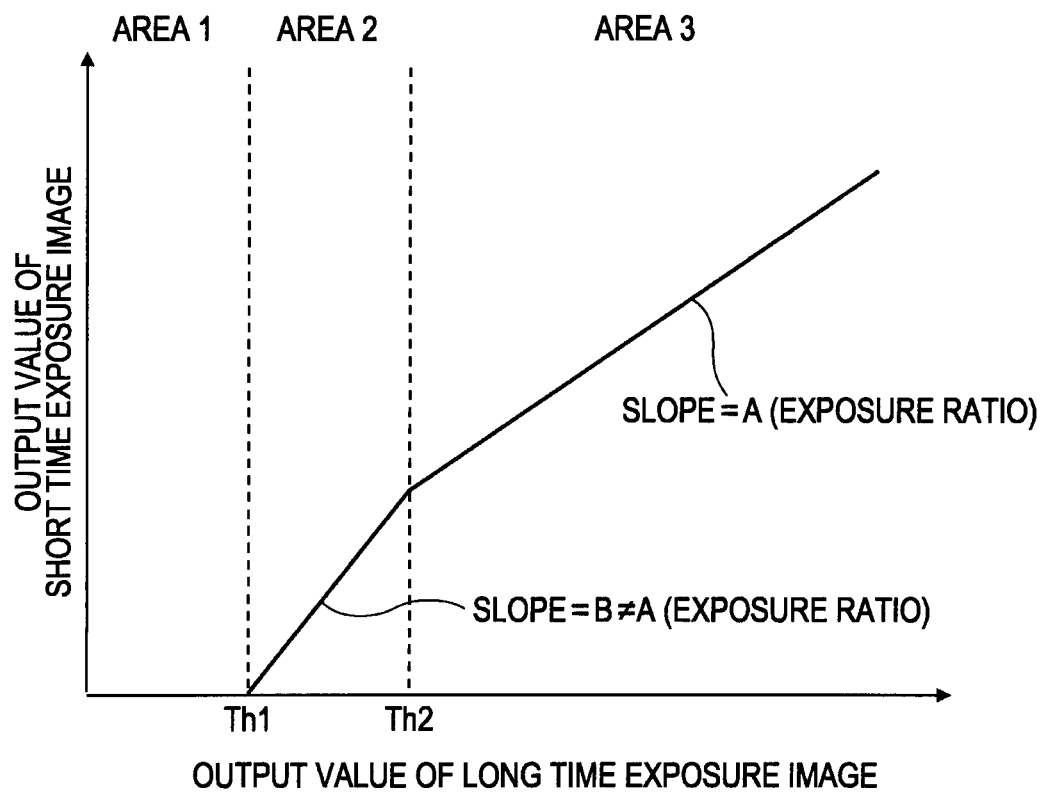
FIG. 12 is a diagram illustrating a correspondence relationship between an output value of a long time exposure image and an output value of a short time exposure image.

FIG. 12 illustrates a graph of a correspondence relationship between the output value (luminance) of the long time exposure image (LE) and the output value (luminance) of the short time exposure image (SE) similarly to FIG. 2 described above.

For example, the imaging device disclosed in the aforementioned Japanese Unexamined Patent Application Publication No. 2008-99158 has the characteristics illustrated in FIG. 12. In other words, the output of the short time exposure does not occur until the output of the long time exposure becomes equal to or larger than a certain level (Area 1 in FIG. 12). This denotes that, in FIG. 1 described above, if the brightness of the subject does not exceed an intermediate voltage sustaining level, the output of the short time exposure does not occur.

If the brightness of the subject exceeds the intermediate voltage sustaining level, the output of the short time exposure occurs. However, the value of the output of the short time exposure at the time of occurrence of the output is very unstable. Since, during the exposure period of the short time exposure, since the brightness does not exceeds the intermediate voltage sustaining level and since a valid output does not occur, the slope in the interval is different from the slope defined by an exposure ratio (Area 2 in FIG. 12). In addition, the exposure ratio is the exposure ratio A (=LE/SE) which is a ratio of an exposure amount of the long time exposure image (LE) to an exposure amount of the short time exposure image (SE).

This is caused by complicated processes such as the short time exposure process being performed through complicated processes including sweeping-out accumulated charges of the photodiode (PD) and, after that, performing the short time exposure, and the like. In other words, as described above with reference to FIG. 1, in the short time exposure process, in the time t1 (charge sweeping starting point P1) illustrated in FIG. 1, first, the accumulated charges of the light sensing photodiode (PD) are swept out down to an intermediate voltage sustaining level controlled in the photodiode (PD), and after the charge sweeping process, the exposure process is performed again with the exposure time TS (t2 to t3).

In Area 2 of FIG. 12, the output value is calculated based on the accumulated charge amount of the photodiode (PD) just after the start of the short time exposure process, and the portion becomes a very unstable output. In addition, the correspondence (slope B) between the output values of the long time exposure image (LE) and the short time exposure image (SE) is set to the slope B (≠ slope A (exposure ratio)) which is different from the slope defined by the exposure ratio A (=LE/SE) which is a ratio of exposure amounts.

In the next Area 3, since the charge accumulation of the photodiode (PD), where the short time exposure process is performed, becomes the output values in a stable state, a constant slope A (exposure ratio) may be calculated from the exposure ratio. The same relationship described above may be used for the case of combining three or more images.

The correspondence relationship between the output values of the long time exposure image and the output values of the short time exposure image described above with reference to FIG. 2 is a theoretical relationship but it is coincident with output values of an actual imaging device. The correspondence relationship depends on characteristics of the imaging device, so that, in many cases, the relationship between the output values of the long time exposure image and the output values of the short time exposure image may be the relationship illustrated in FIG. 12.

By taking this into consideration, in the case where the before-combination image comparison unit 205 illustrated in FIG. 11 performs the comparison of the output values between the pixels of the to-be-combined images (images n) having different exposure times before the combination, the pixels are selected as comparison objects only with respect to Area 3 illustrated in FIG. 12, that is, the pixels having luminance equal to or higher than a predetermined threshold value luminance level (Th2 in FIG. 12), and the pixel value comparison process is performed only on the selected pixels.

In addition, the threshold value luminance level (Th2 in FIG. 12) is determined according to the characteristics of the imaging device so as to be predetermined according to such a luminance level that the output is stabilized in the short time exposure.

Figure 13:
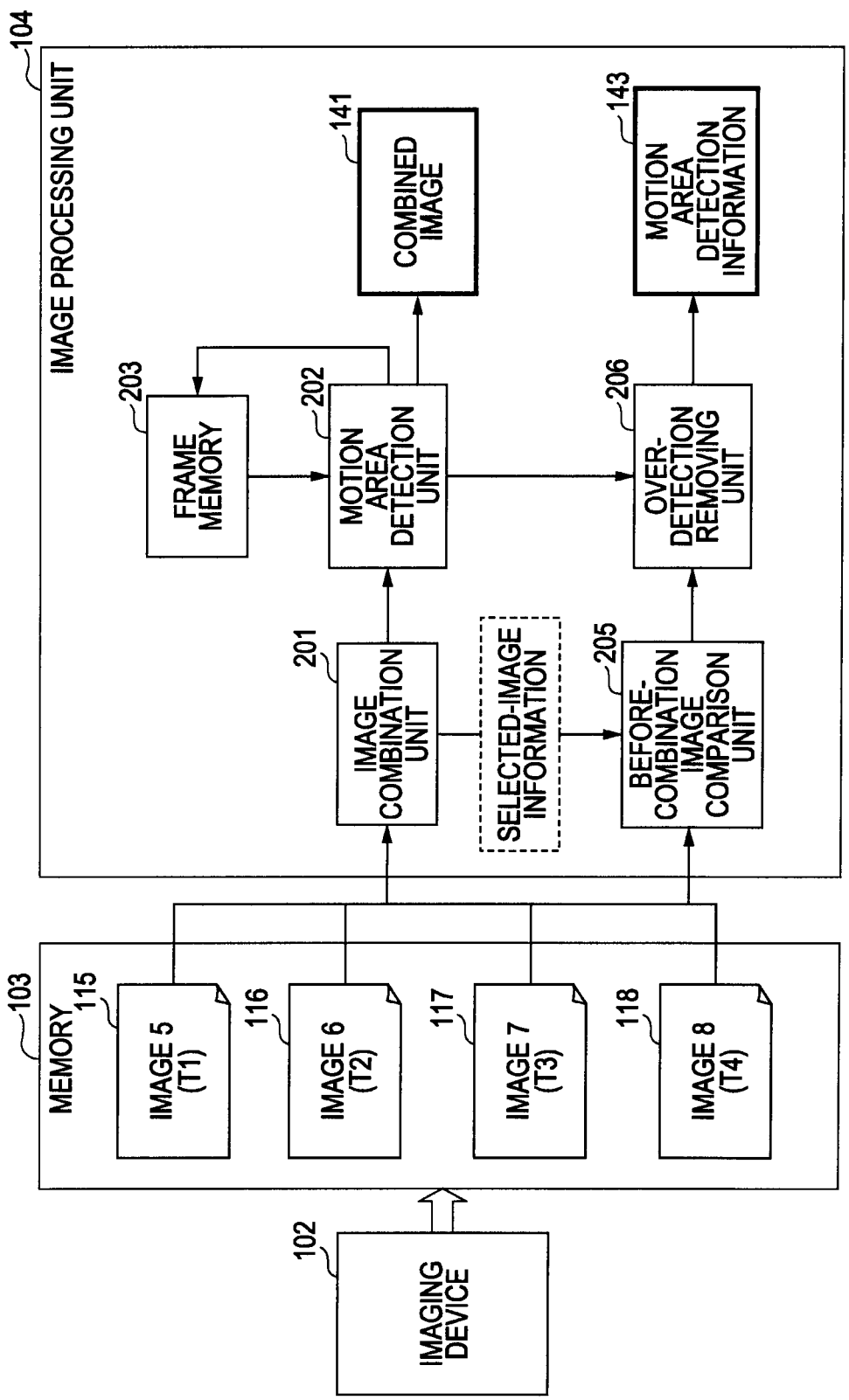
FIG. 13 is a block diagram illustrating a process of the image processing apparatus according to the third embodiment.

The before-combination image comparison unit 205 compares the output values of the long time exposure image and the short time exposure image, which are the to-be-combined images, at the pixels having luminance equal to or more than a predetermined threshold value luminance level (Th2 of FIG. 12) and outputs the result of the comparison to the over-detection removing unit 203 (refer to FIG. 13). The over-detection removing unit 203 performs re-verification on the pixel area, which the motion area detection unit 202 determines to be a motion area in the result of pixel value comparison between the combined images, based on the information received from the before-combination image comparison unit 205.

In other words, in the case where the difference between the output values of the long time exposure image and the short time exposure image, which are the to-be-combined images, is less than a predetermined threshold value, the pixel area which is determined to be a motion area in the result of the pixel value comparison between the combined images is determined not to be a motion area, so that the determination of the motion area is cancelled.

FIG. 13 is a block diagram illustrating an image processing apparatus according to the embodiment. The figure is different from FIG. 7 in that a before-combination comparison unit 205 and an over-detection removing unit 206 are included.

The imaging device 102 outputs images 115 to 118 (exposure time=T1 to T4) and stores the images in the memory 103. The image processing unit 104 is input with these images 115 to 118 (exposure time=T1 to T4) and allows the image combination unit 201 to perform the image combining process and generate the combined image. In addition, in FIG. 13, it is described that the combined image generated by using the former images 111 to 114 (exposure time=T1 to T4) is already stored in the frame memory 203.

As described above with reference to FIG. 6, the image combination unit 201 generates the combined image, where the whited-out pixel having the saturated pixel value is removed, by combining the images having different exposure times according to the luminance. The combined image generated by the image combination unit 201 is input to the motion area detection unit 202. For example, in the case where a combined image a generated from four images and a combined image b generated from next four images are consecutively input, the motion area detection unit 202 passes the combined image a that is formerly input and stores the combined image a together with an output (combined image 141) in a frame memory 203.

If the latter combined image b generated from the four images is input from the image combination unit 201, the motion area detection unit 202 reads the former combined image a from the frame memory 203 and compares the former combined image a with the latter combined image b input from the image combination unit 201.

If the pixel values at the coordinate positions corresponding to the combined image a and the combined image b sit on the line having a slope of 1 illustrated in FIG. 6, it is determined that the subject is stationary. If the pixel values deviate from the line having a slope of 1 illustrated in FIG. 6, it is determined that there is a motion area. However, as described with reference to the aforementioned formula (Formula 1), it is preferable to perform a process of determining a pixel area, where a pixel value difference equal to or larger than an allowable difference value [Th1] determined according to performance or the like of the employed solid-state imaging device is detected, to be a motion area by using the allowable difference value [Th1].

In the embodiment, the detection result of the motion area detection unit 202 is input to the over-detection removing unit 206. The over-detection removing unit 206 performs re-verification on the pixel area which is determined to be a motion area based on the pixel value comparison at the corresponding coordinate positions of the combined image a and the combined image b and performs an over-detection removing process of determining a pixel of the motion area, which is determined to be over-detection, not to be in the motion area.

In other words, the over-detection removing unit 206 is input from the before-combination image comparison unit 205 with the result of comparison between the output value of the long time exposure image and the output value of the short time exposure image, which become the to-be-combined image. In the case where, with respect to the pixel area determined to be the motion area in the result of the pixel value comparison between the combined images, the difference between the output value of the long time exposure image and the output value of the short time exposure image, which become the to-be-combined image, is smaller than a predetermined threshold value, the over-detection removing unit 206 performs the over-detection removing process of determining that the area is not a motion area and canceling the determination of the motion area.

In addition, as described above, the before-combination image comparison unit 205 compares the output values of the long time exposure image and the short time exposure image, which are the to-be-combined images, at the pixels having luminance equal to or more than a predetermined threshold value luminance level (Th2 of FIG. 12) and outputs the result of the comparison to the over-detection removing unit 206 of the motion area detection unit 202.

The before-combination comparison unit 205 sets some degree of the allowable amount similarly to the aforementioned formula (Formula 1) and performs the determination of the motion area by using the following formula (Formula 2). In the case where the following Formula 2 is not satisfied in Area 3 illustrated in FIG. 12, it is determined that the area is not a motion area, and the area is an object for removal from the motion area.

In the case where the short time exposure image (for example, Image 5 (T1) 115) and the long time exposure image (for example, Image 6 (T2) 116) are set as objects of comparison.

(Output of Short Time Exposure Image)×0.1>|(Output of Long Time Exposure Image)−(Output of Short Time Exposure Image)×$A$)| (Formula 2)

In addition, A is an exposure ratio A (=LE/SE) which is a ratio of an exposure amount of a long time exposure image (LE) to an exposure amount of a short time exposure image (SE).

The above formula (Formula 2) denotes that, for example, if the exposure ratio A=10, an absolute value obtained by subtracting 10 times the output value of Image 5 (T1) 115 (short time exposure image) from the output value of Image 6 (T2) 116 (long time exposure image) is expressed.

In this manner, although the motion area detection unit 202 determines a pixel area to be a motion area based on the comparison of the pixel value between the combined images, the over-detection removing unit 206 performs a process of determining that the area which satisfies the following Formula 2 in Area 3 illustrated in FIG. 12 is not a motion area and removing the area from the motion area.

In addition, the comparison process is not performed on all the combinations of before-combination images, but it is performed before and after the image selected as the pixel constituting the combined image at the time of generation of the combined image (selection information is obtained from the image combination unit 102). In other words, for example, in the case where the pixel of Image 6 (T2) 116 is selected as a valid pixel value of a specific pixel of the combined image, the comparison is performed between Image 6 (T2) 116 and Image 5 (T1) 115 and between Image 6 (T2) 116 and Image 7 (T3) 117.

In this manner, the motion area detection unit 202 performs (1) a detection process of detecting a motion area through pixel value comparison between the combined images.

The over-detection removing unit 206 performs (2) a re-detection process of detecting a motion area through the pixel value comparison between the to-be-combined images, which are sources of the combined images. The over-detection removing unit 206 determines only the pixel area, which is determined to be the motion area in the two-step process, as a final motion area and outputs the motion area detection information 143.

The motion area detection information 143 is configured with, for example, pixel-corresponding motion area detection information or the like, in which motion area pixel=1 and non-motion area pixel=0 in units of a pixel of the image.

In the embodiment, in addition to the imaging device having the configuration of the aforementioned Japanese Unexamined Patent Application Publication No. 2008-99158, a general solid-state imaging device, more specifically, a solid-state imaging device such as a general CCD image sensor or CMOS (Complementary Metal Oxide Semiconductor) image sensor may be employed. In addition, according to the characteristics of the imaging device, the relationship between the output values of the long time exposure image and the output values of the short time exposure image may be the relationship illustrated in FIG. 12, the relationship illustrated in FIG. 2, or the other relationships. It is preferable that the before-combination image comparison unit 205 has a configuration of performing the determination by refining the determination area according to the characteristics of the employed imaging device.

(2-4) Fourth Embodiment

Next, an example of a configuration of an image processing apparatus according to a fourth embodiment of the invention, which detects an image quality deterioration area having a higher possibility of occurrence of image quality deterioration from a motion area, is described.

For example, in the case of using a single plate type solid-state imaging device using R, G, and B color filters (colors of the color filters may be arbitrary), an increase of the image quality deterioration at the time of photographing of a moving subject occurs in the case where the R, G, and B pixels at the positions of the pixels adjacent to a pixel constituting the generated combined image are selected from different to-be-combined images and combined.

As a more detailed example, there is a case where, with respect to the pixels constituting the combined image, a G pixel is selected from the image 112 (T2) having an exposure time T2, and the R pixel and the B pixel adjacent to the G pixel are selected from the image 114 (T4) having an exposure time T4.

In the case where such a combination process is performed, a still picture does not have a serious problem. However, in the case where a moving subject is photographed, the images having different exposure times and exposure intervals are used with adjacent pixels. Therefore, after that, if a de-mosaicing (interpolation) process is performed and observation as a color image is performed, image quality deterioration may occur, and more particularly, pseudo color or the like may occur.

In addition, even in the case where the moving subject is photographed, if the adjacent pixels are selected from the same to-be-combined image, there is no image quality deterioration. This is because the image having the same exposure time and exposure interval is expressed. Therefore, at least the pseudo color or the like does not occur.

Figure 14:
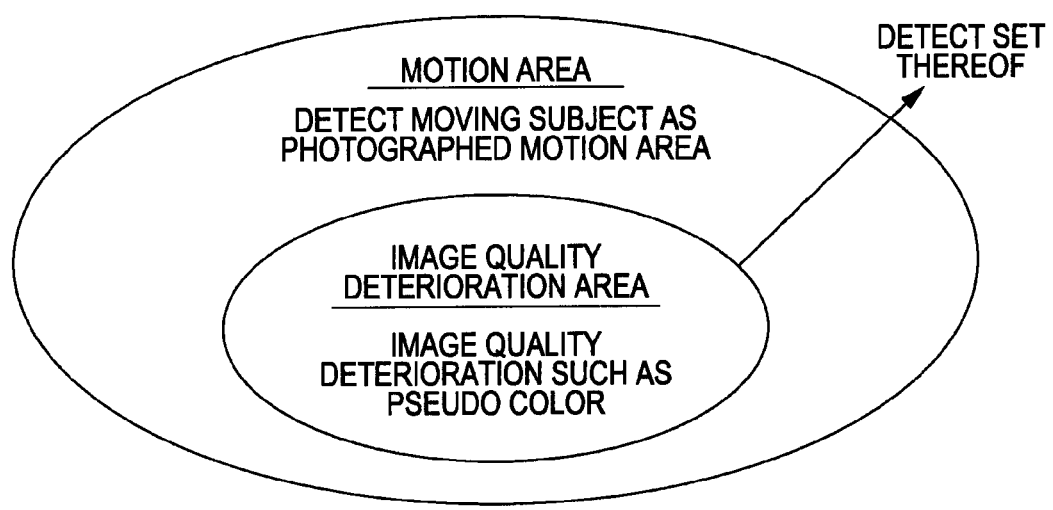
FIG. 14 is a diagram illustrating a concept of a fourth embodiment.

FIG. 14 is a diagram illustrating a concept of the embodiment.

For example, the motion area detected through the several methods of the aforementioned first to third embodiments is a "motion area" as a wide area in FIG. 14, and an "image quality deterioration area", where image quality deterioration (pseudo colors or the like) particularly occurs, is included therein.

In the image processing apparatus according to the fourth embodiment, the pixels of the different to-be-combined images employed between the adjacent pixels are extracted from the pixels constituting the "motion area" which is determined to include the moving subject, and these are detected as the pixels constituting the "image quality deterioration area".

FIG. 15 is a block diagram illustrating an image processing apparatus according to the embodiment. The figure is different from FIG. 7 in that a selected-image comparison unit 207 and an image quality deterioration area detection unit 208 are included.

Since other configurations are the same as those of FIG. 7, the description thereof is omitted. Hereinafter, the difference from the configuration of FIG. 7 is described.

The selected-image comparison unit 207 is input with selected-image information from the image combination unit 201. The selected-image information represents from which of the pixels of to-be-combined images (Image 1 to image 4) are the pixels constituting the combined image generated by the image combining process in the image combination unit 201 selected. The selected-image comparison unit 207 performs a process of setting the adjacent pixels selected from other images as the image quality deterioration area detection object.

The process performed by the selected-image comparison unit 207 is described with reference to FIGS. 16A and 16B. FIGS. 16A and 16B illustrate the following two examples.

(a) Example where an image quality deterioration area is not a detection object (b) Example where an image quality deterioration area is a detection object In each of examples, the determination object is the central pixel among nine pixels.

(a) Example where an Image Quality Deterioration Area is not a Detection Object

In the example, the central pixel used as the determination object is configured with a pixel selected from Image 1 (T1), and all the eight pixels as the adjacent pixels are configured with pixels selected from Image 1 (T1) similarly to the central pixel.

In this manner, in the case where all the pixels adjacent to the to-be-determined pixel, which is the central pixel, are selected from the same image as that for the central pixel, it is determined that there is no possibility of the image quality deterioration, so that it is determined not to be the image quality deterioration area detection object.

(b) Example where an Image Quality Deterioration Area is a Detection Object

On the other hand, in the example illustrated in FIG. 16B, the central pixel used as the determination object is configured with a pixel selected from Image 1 (T1), and two pixels among the eight pixels as the adjacent pixels are configured with pixels selected from Image 2 (T2) differently from the central pixel.

In this manner, in the case where the pixels selected from the image differently from the central pixel are included as the pixels adjacent to the to-be-determined pixel which is the central pixel, it is determined that there is a possibility of the image quality deterioration, so that it is set as the image quality deterioration area detection object.

In this manner, the selected-image comparison unit 207 outputs pixel-corresponding determination information distinguishing between the image quality deterioration area detection object pixels and the image quality deterioration area non-detection object pixels with respect to the pixels constituting the combined image to the image quality deterioration area detection unit 208. For example, the pixel-corresponding image quality deterioration area detection information of the combined image in which image quality deterioration area detection object pixel=1 and image quality deterioration area non-detection object pixel=0 is output to the image quality deterioration area detection unit 208.

The image quality deterioration area detection unit 208 is input with the image quality deterioration area detection information from the selected-image comparison unit 207 and input with the motion area detection information 143 generated based on the process of pixel value comparison between the combined images from the motion area detection unit 202. The motion area detection information 143 is configured with, for example, motion area detection information or the like, in which motion area pixel=1 and non-motion area pixel=0, in units of a pixel of the combined image.

The image quality deterioration area detection unit 208 generates and outputs image quality deterioration motion area detection information 144 as final information based on the image quality deterioration area detection information and the motion area detection information 143.

The image quality deterioration area detection unit 208 extracts only the pixels in which motion area pixel=1 and image quality deterioration area detection object pixel=1 with respect to all the pixels and defines this area as an image quality deterioration motion area.

In other words, the image quality deterioration area detection unit 208 performs an AND process (AND logic calculation) on the image quality deterioration area detection information and the motion area detection information 143 to extract only the pixels, which are in the motion area and which are image quality deterioration area detection objects and determines the pixels as image quality deterioration motion area pixels. The image quality deterioration area detection unit 208 determines pixels other than these pixels as non-image quality deterioration motion area pixels and outputs the image quality deterioration motion area detection information 144 in which the determination information is set in units of a pixel.

The image quality deterioration motion area detection information 144 output from the image quality deterioration area detection unit 208 is configured with, for example, pixel-corresponding image quality deterioration motion area detection information or the like, in which image quality deterioration motion area pixel=1 and non-image quality deterioration motion area pixel=0.

In the embodiment, in addition to the imaging device having the configuration of the aforementioned Japanese Unexamined Patent Application Publication No. 2008-99158, a general solid-state imaging device, more specifically, a solid-state imaging device such as a general CCD image sensor or CMOS (Complementary Metal Oxide Semiconductor) image sensor may be employed.

(2-5) Fifth Embodiment

Next, in an image processing apparatus according to a fifth embodiment of the invention, a configuration of outputting image quality deterioration area detection information as information of detection of an area which is highly likely to cause image quality deterioration is described with reference to FIG. 17.

FIG. 17 is a block diagram illustrating an image processing apparatus according to the embodiment. The configurations of the imaging device 102 and the memory 103 are the same as those of the first embodiment described with reference to FIG. 7.

The process of the image combination unit 201 of the image processing unit 104 is also the same as the configuration of the first embodiment described with reference to FIG. 7, in which the images 1 to 4 having different exposure times are employed to generate the combined image 141.

The output value valid area detection unit 209 is input with selected-image information from the image combination unit 201. The selected-image information represents from which of the pixels of to-be-combined images (Image 1 to image 4) are the pixels constituting the combined image generated by the image combination unit 201 selected. The selection information is the same as the selection information of the fourth embodiment described with reference to FIG. 15.

When the output value valid area detection unit 209 is input with the selection information, the output value valid area detection unit 209 acquires the corresponding pixel values of the selected images, that is, the before-combination to-be-combined images (Image 1 to image 4) stored in the memory 103 with respect to all the pixels constituting the combined image and determines the validity of the output values of the before-combination images.

For example, in the case where valid bits of the image are configured with 10-bit data and the values which the bit values are able to take, that is, the digit values are in a range of from 0 to 1023 digits, the output value valid area detection unit 209 determines that the validity of the bit values at the two ends of the range is low. More specifically, for example, in the case where the bit values (0 to 1023 digits) of the pixels constituting the combined image satisfy the following Formula 3, Bit Value>1000 digits or Bit Value<5 digits     (Formula 3)

it is determined that the validity of the bit values of the pixels is low, so that the area is determined to be an image quality deterioration area (the fifth embodiment (refer to FIG. 17)).

Bit Value>1000 digits

The pixel satisfying the formula is the pixel of which the pixel value almost reaches the saturated level.

Bit Value<5 digits

The pixel satisfying the formula is the pixel of which the pixel value is almost in the vicinity of zero.

Since there is a small possibility that such a pixel is to output an accurate pixel value, the area is determined a pixel area in which there is no validity of the pixel value.

In this manner, the output value valid area detection unit 209 determines based on the pixel values of the pixels constituting the combined images by using the determination formula (Formula 3) whether or not the pixel values are set as the pixel values of which the validity is actually prevented and generates and outputs image quality deterioration area detection information 145, in which the determination result is set as the pixel-corresponding validity information.

The image quality deterioration area detection information 145 is configured with, for example, pixel-corresponding image quality deterioration area information or the like, in which image quality deterioration area pixel=1 representing the pixel that satisfies the aforementioned formula 3 and non-image quality deterioration area pixel=0 representing the pixel that does not satisfy the aforementioned formula 3, in units of a pixel of the combined image.

(2-6) Sixth Embodiment

Next, a configuration of an image processing apparatus according to a sixth embodiment of the invention is described with reference to FIG. 18.

The image processing apparatus illustrated in FIG. 18 is a modified example of the fifth embodiment illustrated in FIG. 17.

The image processing apparatus illustrated in FIG. 18 has the configuration of the first embodiment described with reference to FIG. 7 as well as the configuration of the fifth embodiment described with reference to FIG. 17.

The image combining process in the image combination unit 201 is the same as the process of the first embodiment.

The imaging device 102 outputs images 111 to 114 (exposure time=T1 to T4) and stores the images in the memory 103. The image processing unit 104 is input with the images 111 to 114 (exposure time=T1 to T4) and allows the image combination unit 201 to perform the image combining process to generate the combined image.

The motion area detection unit 202 illustrated in FIG. 18 performs the process described with reference to FIG. 7. In other words, the motion area detection unit 202 performs the pixel value comparison between the combined images, generates the motion area detection information 143 of the combined image and outputs to the image quality deterioration area detection unit 208.

The motion area detection information 143 generated by the motion area detection unit 202 is configured with, for example, pixel-corresponding motion area detection information or the like, where motion area pixel=1 and non-motion area pixel=0, in units of a pixel constituting the combined image.

On the other hand, the output value valid area detection unit 209 is input with the selected-image information from the image combination unit 201. The selected-image information represents from which of the pixels of to-be-combined images (Image 1 to image 4) are the pixels constituting the combined image generated by the image combination unit 201 selected. The output value valid area detection unit 209 acquires the corresponding pixel values of the selected images, that is, the before-combination to-be-combined images (Image 1 to image 4) stored in the memory 103 with respect to all the pixels constituting the combined image and determines the validity of the output values of the before-combination images.

This process is the same as the process performed by the output value valid area detection unit 209 of the fifth embodiment described with reference to FIG. 17.

More specifically, for example, in the case where valid bits of the pixels constituting the combined image are configured with 10-bit data and the values which the bit values are able to take, that is, the digit values are in a range of from 0 to 1023 digits, the output value valid area detection unit 209 determines that the validity of the bit values at the two ends of the range is low. More specifically, for example, in the case where the bit values (0 to 1023 digits) of the pixels constituting the combined image satisfy the following Formula 3, Bit Value>1000 digits or Bit Value<5 digits                                  (Formula 3)

it is determined that the validity of the bit values of the pixels is low, so that the area is determined to be an image quality deterioration area. Image quality deterioration area detection information 145 in which the determination result is set as the pixel-corresponding validity information is generated and output.

The image quality deterioration area detection information 145 is configured with, for example, pixel-corresponding image quality deterioration area information or the like, in which image quality deterioration area pixel=1 representing the pixel that satisfies the aforementioned formula 3 and non-image quality deterioration area pixel=0 representing the pixel that does not satisfy the aforementioned formula 3, in units of a pixel of the combined image.

The image quality deterioration area detection unit 208 generates and outputs image quality deterioration motion area detection information 144 as final information based on the image quality deterioration area detection information and the motion area detection information 143.

The image quality deterioration area detection unit 208 extracts only the pixels in where motion area pixel=1 and image quality deterioration area pixel=1 with respect to all the pixels and defines this area as an image quality deterioration motion area.

In other words, the image quality deterioration area detection unit 208 performs an AND process (AND logic calculation) on the image quality deterioration area detection information 145 and the motion area detection information 143 to extract only the pixels, which are in the motion area and which are in the image quality deterioration area, and determines the pixels as image quality deterioration motion area pixels. The image quality deterioration area detection unit 208 determines pixels other than these pixels as non-image quality deterioration motion area pixels and outputs the image quality deterioration motion area detection information 144 in which the determination information is set in units of a pixel.

The image quality deterioration motion area detection information 144 output from the image quality deterioration area detection unit 208 is configured with, for example, pixel-corresponding image quality deterioration motion area detection information or the like, in which image quality deterioration motion area pixel=1 and non-image quality deterioration motion area pixel=0.

In this manner, in the sixth embodiment illustrated in FIG. 18, a configuration of adding the results of the aforementioned first and fifth embodiments is provided.

In the sixth embodiment, similarly to the fifth embodiment, a process of determining a pixel, of which the pixel value is close to a saturated pixel value or zero, as the image quality deterioration area is performed. However, in the embodiment, in the motion detection process using the data after combined image, the area that is not detected as the motion area is not selected as the image quality deterioration motion area.

Therefore, if there is no pixel value difference by which a motion area is determined in the corresponding pixel values of the combined image as a comparison object of the combined image, the area is removed from the image quality deterioration motion area. Therefore, in comparison with the fifth embodiment, detection of an excessive image quality deterioration area may be avoided.

In the embodiment, in addition to the imaging device having the configuration of the aforementioned Japanese Unexamined Patent Application Publication No. 2008-99158, a general solid-state imaging device, more specifically, a solid-state imaging device such as a general CCD image sensor or CMOS (Complementary Metal Oxide Semiconductor) image sensor may be employed.

(2-7) Seventh Embodiment

Next, a configuration of an image processing apparatus according to a seventh embodiment of the invention is described with reference to FIGS. 19 and 20.

Figure 19:
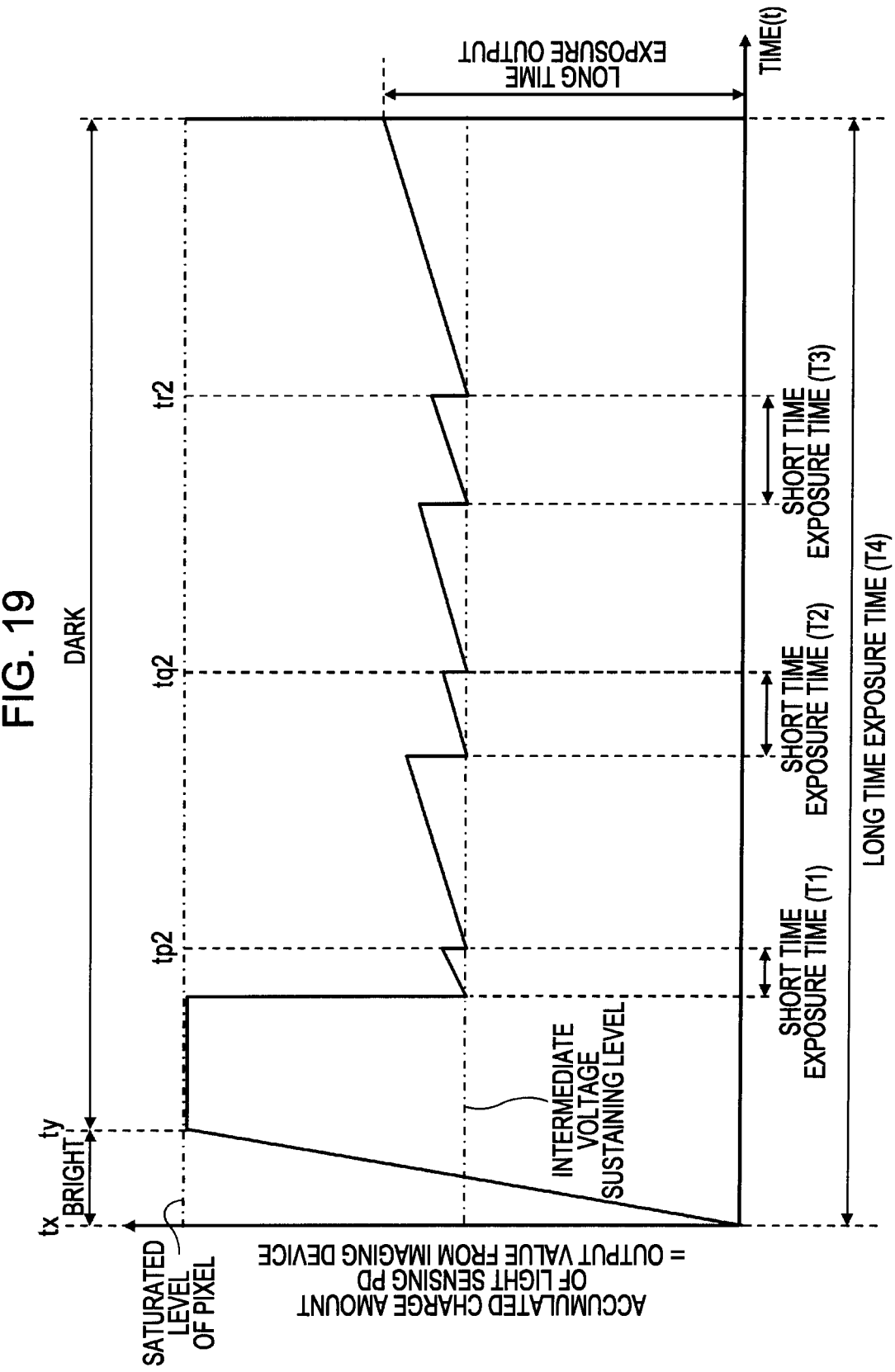
FIG. 19 is a diagram illustrating an example of an output signal of an imaging device in the case where a subject moves.

FIG. 19 is the same characteristic diagram as that of FIG. 5. Namely, FIG. 19 is a diagram illustrating a process of acquiring a plurality of images in a range of from the long time exposure image to the short time exposure image. In FIG. 19, the horizontal axis is a time (t), and the vertical axis is an accumulated charge amount (e) in a light sensing photodiode (PD) constituting a photoelectric conversion element corresponding to one pixel of a solid-state imaging device. For example, in the case where a sensed light amount of the light sensing photodiode (PD) is large, that is, in the case corresponding to a bright subject, the charge accumulation amount is rapidly increased as time elapses. On the other hand, in the case where the sensed light amount of the light sensing photodiode (PD) is small, that is, in the case corresponding to a dark subject, the charge accumulation amount is gradually increased as time elapses.

FIG. 19 is a diagram considering a process for pixels obtained by photographing a moving subject. The figure illustrates a case where at the start time of the photographing it is bright and, after that, it is dark. In FIG. 19, since the signal in the bright situation at the start time (time=tx to ty) exceeds the intermediate voltage sustaining level, the area of the short time exposure appears. However, in the meantime (time=ty), the subject moves, so that the pixel value is darkened.

After the pixel value is darkened due to the motion of the bright subject, the short time exposure is performed. The short time exposure time (T1 to T3) is illustrated in FIG. 19. Since this period is after the bright subject has already moved, the dark subject is photographed in this situation, and the speed of accumulation of the charges of the light sensing photodiode (PD) is decreased, so that the slope of the line illustrated in the figure is increased. Next, after the long time exposure time (T4) elapses, the long time exposure output is obtained. In this case, since the dark subject is photographed, the slope is decreased in the period after the time t2, so that the long time exposure output where the pixel does not approach the saturated level may be obtained.

In the image combining process, the comparison between the output values of the short time exposure and the output values of the long time exposure is performed. However, in this example, since the output of the short time exposure is small, the output of the long time exposure may be selected. Herein, there is a problem in that the output values of the long time exposure may not be correct. This is because, as illustrated in FIG. 19, there is a signal approaching the intermediate voltage sustaining level as an offset on the long time exposure output obtained after the long time exposure time (T4) elapses.

If the amount of the offset is subtracted and the adjustment of the exposure ratio is performed by taking into consideration the exposure time, an accurate output value may be calculated. However, in an actual case, since there is an irregularity in the intermediate voltage due to the device, it is difficult to obtain the accurate value. Therefore, there is a problem in that the combined image obtained in this situation may have, particularly, a large amount of the image quality deterioration. In the embodiment, a method of detecting such a pixel is disclosed.

Figure 20:
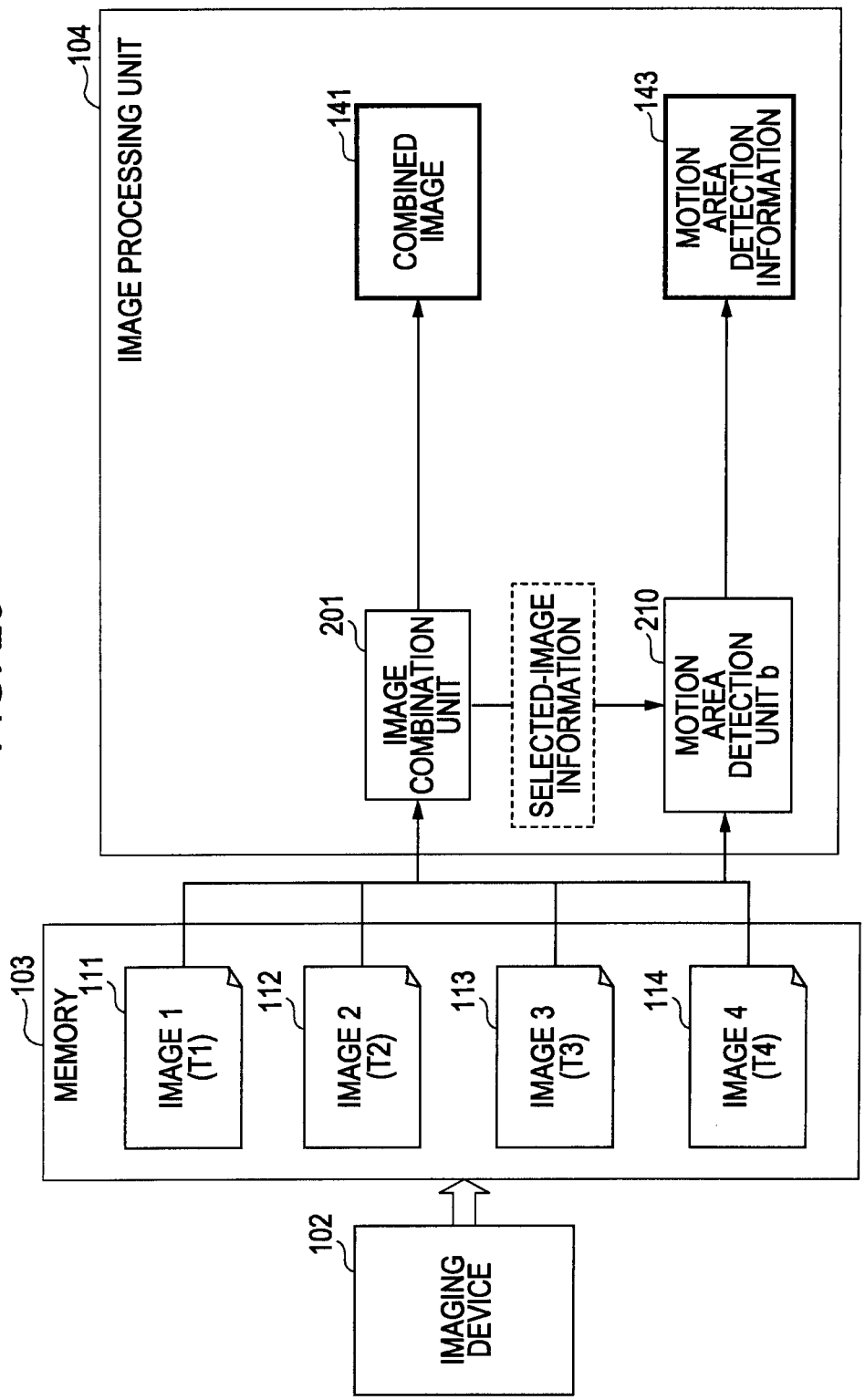
FIG. 20 is a block diagram illustrating a process of an image processing apparatus according to a seventh embodiment.

FIG. 20 is a block diagram illustrating an image processing apparatus according to the embodiment. The configuration of the imaging device 102 and the memory 103 is the same as those of the first embodiment described with reference to FIG. 7.

The process of the image combination unit 201 of the image processing unit 104 is also the same as that of the first embodiment described with reference to FIG. 7, in which the images 1 to 4 having different exposure times are employed to generate the combined image 141.

The motion area detection unit b 210 is input with selected-image information from the image combination unit 201. The selected-image information represents from which of the pixels of to-be-combined images (Image 1 to image 4) are the pixels constituting the combined image generated by the image combination unit 201 selected. The selection information is the same as the selection information of the fourth embodiment described with reference to FIG. 15.

The motion area detection unit b 210 is input with the outputs (pixel values) of the image 1, 111 to image 4, 114 which are to-be-combined images stored in the memory 103, and the selected-image information from the image combination unit 201. The motion area detection unit b 210 acquires the corresponding pixel values of the selected images, that is, the before-combination to-be-combined images (Image 1 to image 4) stored in the memory 103 with respect to all pixels constituting the combined image and determines whether or not the pixels constituting the combined image satisfy the following conditions.

As a pixel constituting the combined image, the long time exposure image (in this case, Image 4 (T4), 114) is selected.

In addition, any one of the following formulas is satisfied.

(Output of Image 1(*T*1)111)>5 digits, (Output of Image 2(*T*2)112)>5 digits, or (Output of Image 3(*T*3)113>5 digits)  (Formula 4)

A pixel satisfying the above conditions is determined to be the pixel which is in the motion area.

However, there is considered a case that valid bits of the images are configured with 10-bit data and the values which the bit values are able to take, that is, the digit values are in a range of from 0 to 1023 digits.

In the determination process, any one of the short time exposure images (Images 1 to 3) outputs a valid pixel value (for example, larger than 5 digits), and in addition, in the case where the long time exposure image (image T4) is selected as a value of pixels on the combined image of the pixel, the pixel is the pixel that is in the situation described with reference to FIG. 19.

A pixel satisfying the above conditions is determined to be the pixel which is in the motion area.

The motion area detection unit b 210 illustrated in FIG. 20 generates and outputs motion area detection information 143 through the process. The motion area detection information 143 is configured with, for example, pixel-corresponding motion area detection information or the like, in which motion area pixel=1 and non-motion area pixel=0 in units of a pixel constituting the combined image.

(2-8) Eighth Embodiment

Next, a configuration of an image processing apparatus according to a seventh embodiment of the invention is described with reference to FIG. 21.

Figure 21:
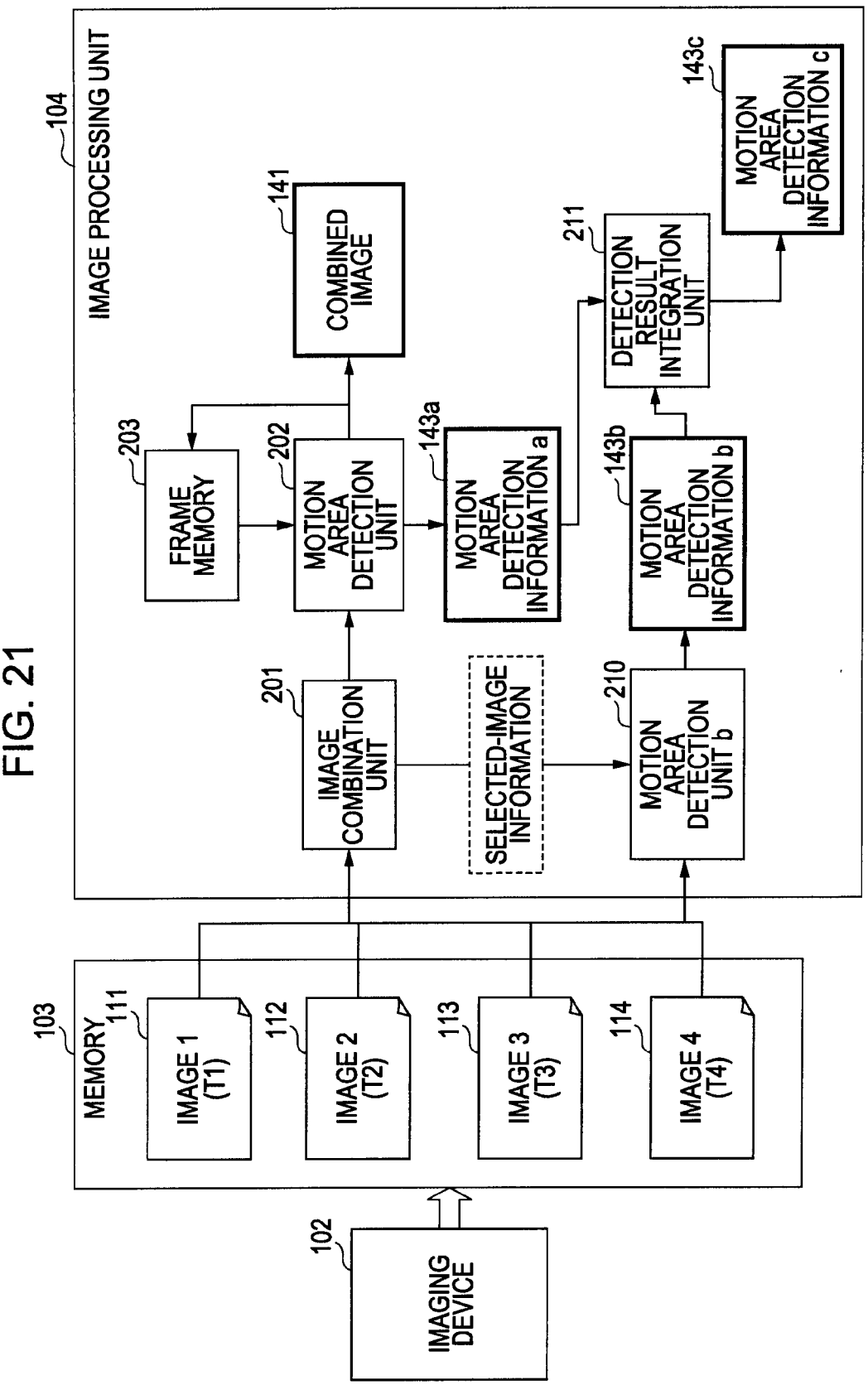
FIG. 21 is a block diagram illustrating a process of an image processing apparatus according to an eighth embodiment.

The image processing apparatus illustrated in FIG. 21 is a modified example of the seventh embodiment illustrated in FIG. 20.

The image processing apparatus illustrated in FIG. 21 has the configuration of the first embodiment described with reference to FIG. 7 and the configuration of the seventh embodiment described with reference to FIG. 20.

The image combining process in the image combination unit 201 is the same as the process of the first embodiment.

The imaging device 102 outputs images 111 to 114 (exposure time=T1 to T4) and stores the images in the memory 103. The image processing unit 104 is input with the images 111 to 114 (exposure time=T1 to T4) and allows the image combination unit 201 to perform the image combining process to generate the combined image.

The motion area detection unit 202 illustrated in FIG. 21 performs the same process as that of the motion area detection unit 202 described with reference to FIG. 7. In other words, the motion area detection unit 202 performs the pixel value comparison between the combined images to generate and output the motion area detection information a 143*a* of the combined image.

The motion area detection information a 143*a* generated by the motion area detection unit 202 is configured with, for example, pixel-corresponding motion area detection information or the like, where motion area pixel=1 and non-motion area pixel=0 in units of a pixel constituting the combined image.

On the other hand, the motion area detection unit b 210 illustrated in FIG. 21 performs the same process as that of the motion area detection unit b 210 described with reference to FIG. 20.

In other words, the motion area detection unit b 210 is input with the outputs (pixel values) of the image 1, 111 to image 4, 114 which are to-be-combined images stored in the memory 103, and the selected-image information from the image combination unit 201. The motion area detection unit b 210 acquires the corresponding pixel values of the selected images, that is, the before-combination to-be-combined images (Image 1 to image 4) stored in the memory 103 with respect to all pixels constituting the combined image and determines whether or not the pixels constituting the combined image satisfy the following conditions.

As a pixel constituting the combined image, the long time exposure image (in this case, Image 4 (T4) 114) is selected.

In addition, any one of the following formulas is satisfied.

(Output of Image 1(*T*1)111)>5 digits, (Output of Image 2(*T*2)112)>5 digits, or (Output of Image 3(*T*3)113>5 digits)  (Formula 4)

A pixel satisfying the above conditions is determined to be the pixel which is in the motion area.

However, there is considered a case that valid bits of the images are configured with 10-bit data and the values which the bit values are able to take, that is, the digit values are in a range of from 0 to 1023 digits.

The motion area detection unit b 210 illustrated in FIG. 21 generates and output motion area detection information b 143*b* through the process. The motion area detection information b 143*b* is configured with, for example, pixel-corresponding motion area detection information or the like, in which motion area pixel=1 and non-motion area pixel=0 in units of a pixel constituting the combined image.

The detection result integration unit 211 performs a process of integrating the motion area detection information a 143*a* and the motion area detection information b 143*b*.

More specifically, the motion area detected in the motion area detection information a 143*a* and the motion area detected in the motion area detection information b 143*b* are determined to be the final motion area.

In other words, the detection result integration unit 211 performs an AND process (AND logic calculation) on the motion area detection information a 143*a* and the motion area detection information b 143*b* to extract only the pixels that are determined to be in the motion area with respect to both of the two motion area detection information and determines these pixels as the final motion area pixels. The detection result integration unit 211 determines pixels other than these pixels as non-motion area pixels and outputs the motion area detection information c 143*c* in which the determination information is set in units of a pixel.

The motion area detection information c 143*c* is also configured with, for example, pixel-corresponding motion area detection information or the like, in which motion area pixel=1 and non-motion area pixel=0 in units of a pixel constituting the combined image.

In the eighth embodiment, similarly to the seventh embodiment, the motion area determination process is performed with reference to the pixel value of the image having each exposure time described above with reference to FIG. 19. However, in the embodiment, in the motion detection process using data after image combination, an area which is not detected as a motion area is not selected as an image quality deterioration motion area.

Therefore, if there is no pixel value difference by which a motion area is determined in the corresponding pixel value of the combined image as a comparison object of the combined image, the area is removed from the motion area. Therefore, in comparison with the seventh embodiment, excessive detection of a motion area may be avoided.

(2-9) Ninth Embodiment

The first and second embodiments may not be configured together, but the third to eighth embodiments may be combined according to the use.

Figure 22:
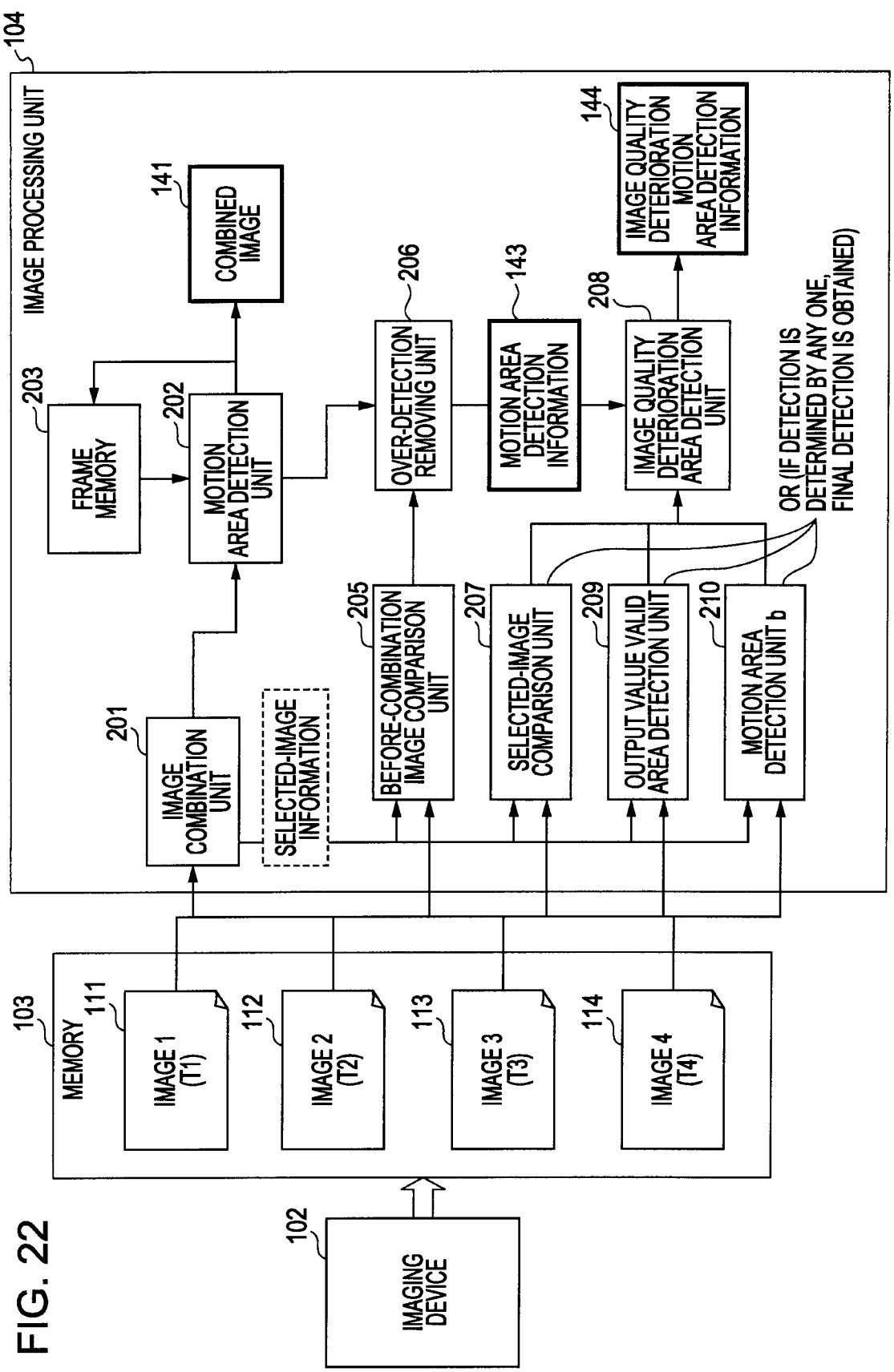
FIG. 22 is a block diagram illustrating a process of an image processing apparatus according to a ninth embodiment.
Figure 23:
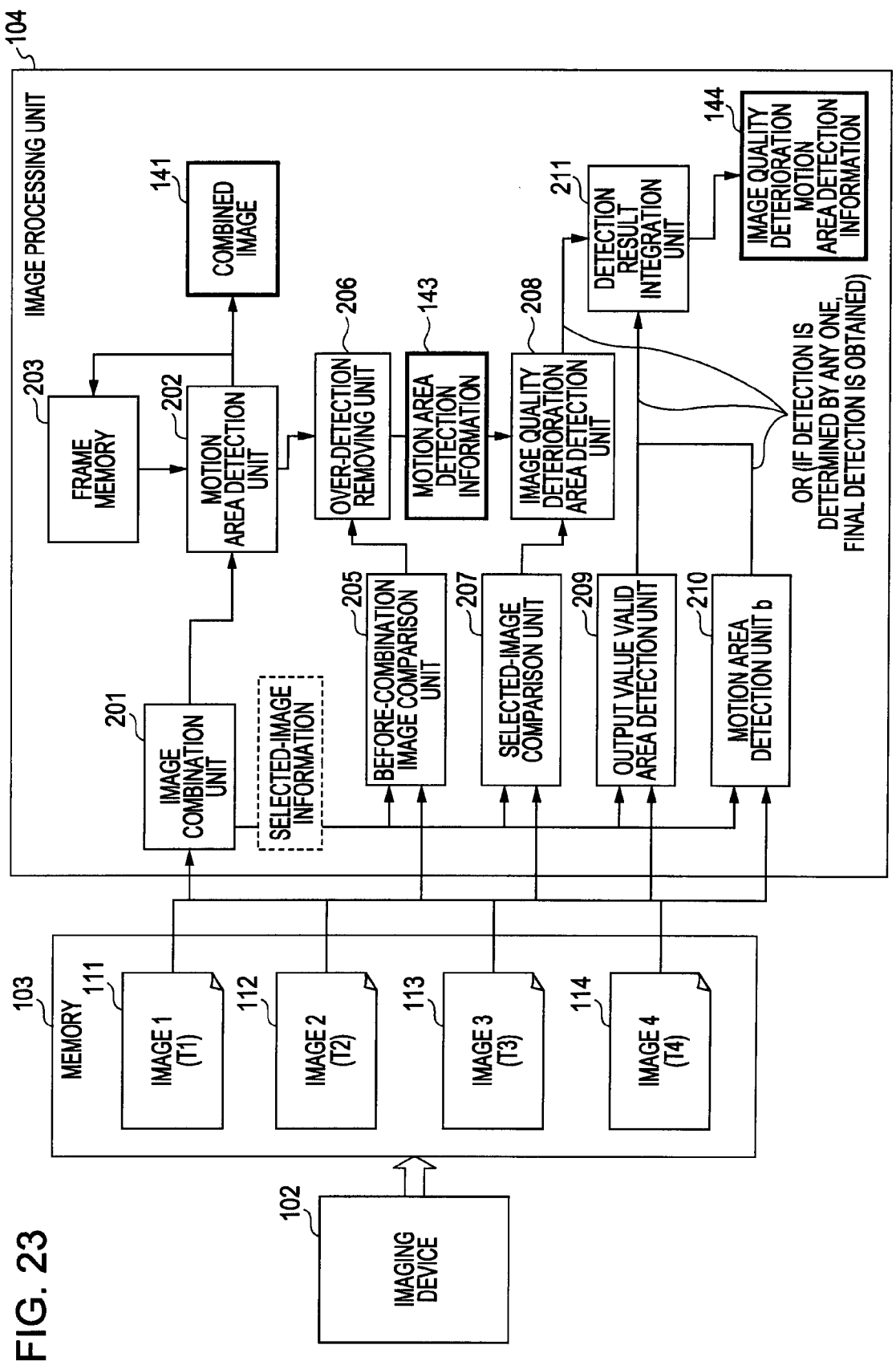
FIG. 23 is a block diagram illustrating a process of the image processing apparatus according to the ninth embodiment.

FIG. 22 is a diagram illustrating an embodiment as a combination of the aforementioned first, third, fourth, sixth, and eighth embodiments. In addition, FIG. 23 is a diagram illustrating an embodiment as a combination of the aforementioned first, third, fourth, fifth, and seventh embodiments.

The configuration of the image processing apparatus illustrated in FIG. 22 includes configurations of performing the following processes.

The motion area detection unit 202 performs detection of the motion area by the pixel value comparison between the combined images (the first embodiment (refer to FIG. 7)).

The before-combination image comparison unit 205 performs the pixel value comparison on the pixels having luminance equal to or more than a predetermined threshold value luminance level (Th2 of FIG. 12) at the pixels of the before-combination to-be-combined images. That is, each of the images having different exposure times T1 to T4 (T1<T2<T3<T4). In the case where the difference between the output value of the long time exposure image and the output value of the short time exposure image is less than a predetermined threshold value, the over-detection removing unit 206 determines that the area is not a motion area and performs the over-detection removing process of canceling the determination of the motion area (the third embodiment (refer to FIG. 13))

In addition, as a result of the over-detection removing, motion area detection information 143 is output. The motion area detection information 143 is configured with, for example, pixel-corresponding motion area detection information or the like, in which motion area pixel=1 and non-motion area pixel=0 in units of a pixel of the combined image.

The selected-image comparison unit 207 is input with selected-image information from the image combination unit 201. The selected-image information represents from which of the pixels of the to-be-combined images (Image 1 to image 4) are the pixels constituting the combined image generated by the image combining process in the image combination unit 201 selected. The selected-image comparison unit 207 performs a process of setting the adjacent pixels selected from other images as image quality deterioration area detection objects (the fourth embodiment (refer to FIGS. 14 and 15)).

The output value valid area detection unit 209 is input with the selected-image information from the image combination unit 201. The selected-image information represents from which of the pixels of the to-be-combined images (Image 1 to image 4) are the pixels constituting the combined image generated by the image combination unit 201 selected. The output value valid area detection unit 209 acquires the corresponding pixel values of the selected images, that is, the before-combination to-be-combined images (Image 1 to image 4) stored in the memory 103 with respect to all the pixels constituting the combined image and determines the validity of the output values of the before-combination images.

More specifically, for example, in the case where the bit values (0 to 1023 digits) of the pixels constituting the combined image satisfy the following Formula 3, Bit Value>1000 digits or Bit Value<5 digits (Formula 3)

it is determined that the validity of the bit values of the pixels is low, so that the area is determined to be an image quality deterioration area (the sixth embodiment (refer to FIG. 18)).

The motion area detection unit b 210 is input with the selected-image information from the image combination unit 201. The selected-image information represents from which of the pixels of the to-be-combined images (Image 1 to image 4) are the pixels constituting the combined image generated by the image combination unit 201 selected. In addition, the motion area detection unit b 210 acquires the corresponding pixel values of the selected images, that is, the before-combination to-be-combined images (Image 1 to image 4) stored in the memory 103 with respect to all the pixels constituting the combined image and determines whether or not the pixels constituting the combined image satisfy the following conditions.

(Output of Image 1(*T*1)111)>5 digits, (Output of Image 2(*T*2)112)>5 digits, or (Output of Image 3(*T*3)113>5 digits) (Formula 4)

A pixel satisfying the above conditions is determined to be the pixel which is in the motion area.

However, there is considered a case that valid bits of the images are configured with 10-bit data and the values which the bit values are able to take, that is, the digit values are in a range of from 0 to 1023 digits (the eighth embodiment (refer to FIGS. 19 and 21)).

The image quality deterioration area detection unit 208 inputs the image quality deterioration area determination information such as (a) image quality deterioration area determination information generated by the selected-image comparison unit 207 (image quality deterioration area determination information generated according to whether or not the pixel is a pixel having adjacent pixels selected from other images), (b) image quality deterioration area determination information generated by the output value valid area detection unit 209 (image quality deterioration area determination information generated according to whether or not the bit value of the combined image is close to zero or a saturated value), and (c) image quality deterioration area determination information generated by the motion area detection unit b 210 (image quality deterioration area determination information associated with a setting pixel of the output of the long time exposure image and generated according to whether or not any one of the short time exposure images is a pixel having a valid pixel value.

The image quality deterioration area detection unit 208 finally determines the area, which is determined to be an image quality deterioration area in any one of the image quality deterioration area determination information of the aforementioned (a) to (c), as an image quality deterioration area.

In addition, the image quality deterioration area detection unit 208 generates and outputs image quality deterioration motion area detection information 144 where an area which is the pixel area determined to be a motion area in the motion area detection information 143 input from the over-detection removing unit 206 and which is determined to be an image quality deterioration area in any one of the image quality deterioration area determination information of the above (a) to (c) is set as an image quality deterioration area and an overlapping area thereof is set as an image quality deterioration motion area.

The image quality deterioration motion area detection information 144 output from the image quality deterioration area detection unit 208 is configured with, for example, pixel-corresponding image quality deterioration motion area detection information or the like, in which image quality deterioration motion area pixel=1 and non-image quality deterioration motion area pixel=0.

In addition, FIG. 23 is a diagram illustration an embodiment as a combination of the first, third, fourth, fifth, and seventh embodiments.

The configuration of the image processing apparatus illustrated in FIG. 23 includes configurations of performing the following processes.

The motion area detection unit 202 performs detection of the motion area by the pixel value comparison between the combined images (the first embodiment (refer to FIG. 7)).

The before-combination image comparison unit 205 performs the pixel value comparison on the pixels having luminance equal to or more than a predetermined threshold value luminance level (Th2 of FIG. 12) at the pixels of the before-combination to-be-combined images. That is, each of the images having different exposure times T1 to T4 (T1<T2<T3<T4). In the case where the difference between the output value of the long time exposure image and the output value of the short time exposure image is less than a predetermined threshold value, the over-detection removing unit 206 determines that the area is not a motion area and performs the over-detection removing process of canceling the determination of the motion area (the third embodiment (refer to FIG. 13))

In addition, as a result of the over-detection removing, motion area detection information 143 is output. The motion area detection information 143 is configured with, for example, pixel-corresponding motion area detection infor-mation or the like, in which motion area pixel=1 and non-motion area pixel=0, in units of a pixel of the combined image.

The selected-image comparison unit 207 is input with selected-image information from the image combination unit 201. The selected-image information represents from which of the pixels of the to-be-combined images (Image 1 to image 4) are the pixel constituting the combined image generated by the image combining process in the image combination unit 201 selected. The selected-image comparison unit 207 performs a process of setting the adjacent pixels selected from other images as the image quality deterioration area detection object (the fourth embodiment (refer to FIGS. 14 and 15)).

The output value valid area detection unit 209 is input with selected-image information from the image combination unit 201. The selected-image information represents from which of the pixels of the to-be-combined images (Image 1 to image 4) are the pixels constituting the combined image generated by the image combination unit 201 selected. The output value valid area detection unit 209 acquires the corresponding pixel values of the selected images, that is, the before-combination to-be-combined images (Image 1 to image 4) stored in the memory 103 with respect to all the pixels constituting the combined image and determines the validity of the output values of the before-combination images.

More specifically, for example, in the case where the bit values (0 to 1023 digits) of the pixels constituting the combined image satisfy the following Formula 3, Bit Value>1000 digits or Bit Value<5 digits (Formula 3)

it is determined that the validity of the bit values of the pixels is low, so that the area is determined to be an image quality deterioration area (the fifth embodiment (refer to FIG. 17)).

The motion area detection unit b 210 is input with the selected-image information from the image combination unit 201. The selected-image information represents from which of the pixels of the to-be-combined images (Image 1 to image 4) are the pixels constituting the combined image generated by the image combination unit 201 selected. In addition, the motion area detection unit b 210 acquires the corresponding pixel values of the selected images, that is, the before-combination to-be-combined images (Image 1 to image 4) stored in the memory 103 with respect to all the pixels constituting the combined image and determines whether or not the pixels constituting the combined image satisfy the following conditions.

(Output of Image 1($T$1)111)>5 digits, (Output of Image 2($T$2)112)>5 digits, or (Output of Image 3($T$3)113>5 digits) (Formula 4)

A pixel satisfying the above conditions is determined to be the pixel which is in the motion area.

However, there is considered a case that valid bits of the images are configured with 10-bit data and the values which the bit values are able to take, that is, the digit values are in a range of from 0 to 1023 digits (the seventh embodiment (refer to FIGS. 19 and 20)).

The image quality deterioration area detection unit 208 is input with the image quality deterioration area determination information (image quality deterioration area determination information representing whether or not the pixel has the adjacent pixels selected from among other images) generated by the selected-image comparison unit 207.

In addition, the image quality deterioration area detection unit 208 outputs to the detection result integration unit 211 image quality deterioration motion area detection information where an area which is the pixel area determined to be a motion area in the motion area detection information 143 input from the over-detection removing unit 206 and which is determined to be an image quality deterioration area in the image quality deterioration area determination information is set as an image quality deterioration area.

The detection result integration unit 211 inputs the image quality deterioration area determination information such as (a) image quality deterioration motion area detection information generated by the image quality deterioration area detection unit 208 (b) image quality deterioration area determination information generated by the output value valid area detection unit 209 (image quality deterioration area determination information generated according to whether or not the bit value of the combined image is close to zero or a saturated value), and (c) image quality deterioration area determination information generated by the motion area detection unit b 210 (image quality deterioration area determination information indicating whether to be a setting pixel of an output of a long time exposure image or to be a pixel having a valid pixel value in any one of short time exposure images).

The detection result integration unit 211 finally determines the area, which is determined to be an image quality deterioration motion area or an image quality deterioration area in any one of the aforementioned (a) image quality deterioration motion area detection information and the image quality deterioration area determination information of the (b) and (c), as an image quality deterioration motion area and outputs the image quality deterioration motion area detection information 144 having the above information.

The image quality deterioration motion area detection information 144 output from the detection result integration unit 211 is configured with, for example, pixel-corresponding image quality deterioration motion area detection information or the like, in which image quality deterioration motion area pixel=1 and non-image quality deterioration motion area pixel=0.

(2-10) Tenth Embodiment

Figure 24:
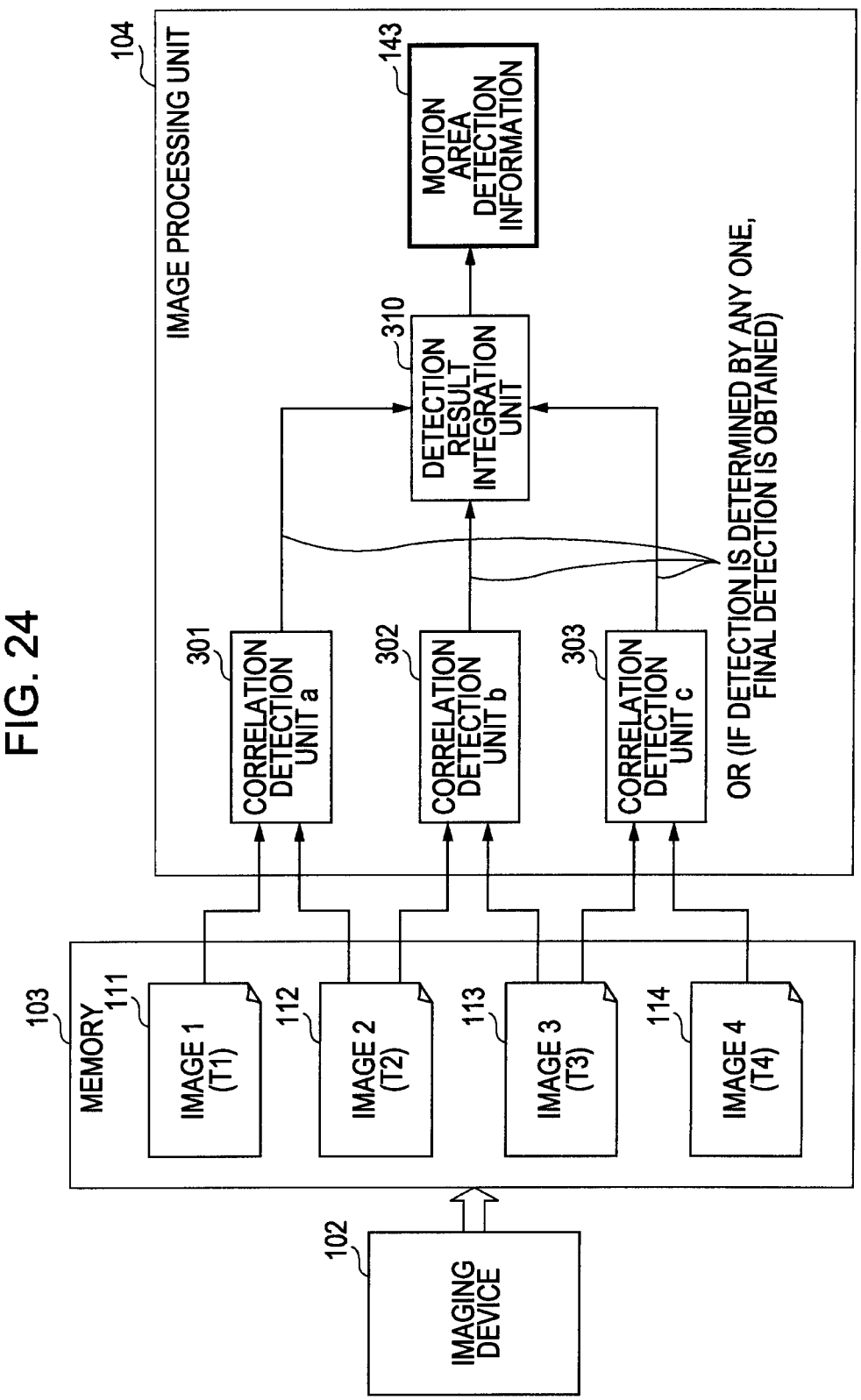
FIG. 24 is a block diagram illustrating a process of an image processing apparatus according to a tenth embodiment.

The aforementioned first to ninth embodiments may not be used when the previous combined images are not able to be obtained due to some limitation of the system. As an embodiment of a moving subject detection mechanism that is very suitable for such a case, a tenth embodiment is illustrated in FIG. 24.

In the embodiment, the moving subject is detected by comparing the signal levels of four images having exposure times T1 to T4 (T1<T2<T3<T4).

The imaging device 102 outputs the images 111 to 114 (exposure time=T1 to T4) and stores the images in the memory 103.

Figure 25:
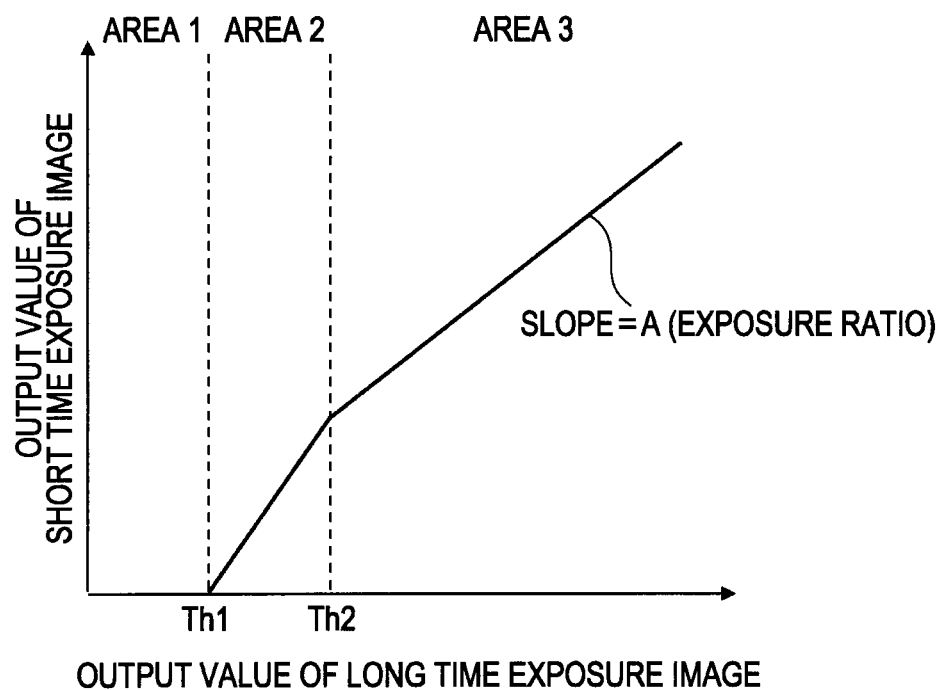
FIG. 25 is a diagram illustrating a correspondence relationship between an output value of a long time exposure image and an output value of a short time exposure image, which is used for a process of the image processing apparatus according to the tenth embodiment.

The correlation detection unit a, 301, the correlation detection unit b, 302, and the correlation detection unit c, 303 are input with Image 1 (exposure time T1) 111 and Image 2 (exposure time T2) 112, Image 2 (exposure time T2) 112 and Image 3 (exposure time T3) 113, and Image 3 (exposure time T3) 113 and Image 4 (exposure time T4) 114, respectively, and compare the pixel values by using the correlation relationship between the long time exposure image and the short time exposure image illustrated in FIG. 25 as a reference.

In the pixel value comparison, the correlation detection units 301 to 303 take the influence of the noise of the solid-state imaging device or the shot noise of light into consideration, so that, if the pixel values of a subject exceed some degree of allowable amount from a reference straight line, the subject is determined to be a moving subject.

The embodiment is effective in the case where the variation in the intermediate voltage is relatively small.

In the case where an exposure time ratio between the long time exposure image (LE) and the short time exposure image (SE) is set to the exposure ratio A (LE/SE), the correlation relationship between the long time exposure image and the short time exposure image illustrated in FIG. 25 is a correlation relationship data where is defined with different slopes with respect to three partitioned areas including a low output area having a correlation relationship line in which area 1=(output of the short time exposure image) is not able to be obtained, a medium output area having a correlation relationship line in which area 2=(slope larger than the exposure ratio A (LE/SE)), and a high output area which is determined from area 3=(exposure ratio A (LE/SE)).

The correlation relationship illustrated in FIG. 25 is the same as the correlation relationship described with reference to FIG. 12.

The correlation relationship illustrated in FIG. 25 is the correlation information that is generated based on the correlation of the output values of the images having different exposure times as comparison objects. Herein, each of threshold values Th1 and Th2 is set according to the images as the comparison objects, and it may have to be prepared in advance.

In the image processing apparatus according to the embodiment illustrated in FIG. 24, the correlation detection unit a, 301 is input with Image 1 (exposure time T1) 111 and Image 2 (exposure time T2) 112 and compares the corresponding pixel values by using the correlation relationship between the long time exposure image and the short time exposure image illustrated in FIG. 25 as a reference.

In the case where the result of the pixel value comparison sits on the line illustrated in FIG. 25 or in the case where the difference from the line is within a predetermined threshold value, the area is determined not to be a motion area.

Similarly, the correlation detection unit b, 302 is also input with Image 2 (exposure time T2) 112 and Image 3 (exposure time T3) 113 and compares the corresponding pixel values by using the correlation relationship between the long time exposure image and the short time exposure image illustrated in FIG. 25 as a reference.

In the case where the result of the pixel value comparison sits on the line illustrated in FIG. 25 or in the case where the difference from the line is within a predetermined threshold value, the area is determined not to be a motion area.

Similarly, the correlation detection unit c, 303 is also input with Image 3 (exposure time T3) 113 and Image 4 (exposure time T4) 114 and compares the corresponding pixel values by using the correlation relationship illustrated in FIG. 25 as a reference.

In the case where the result of the pixel value comparison sits on the line illustrated in FIG. 25 or in the case where the difference from the line is within a predetermined threshold value, the area is determined not to be a motion area.

In this manner, the correlation detection unit of the image processing unit 104 according to the embodiment performs the pixel value comparison between the corresponding pixels of the images having different times by employing the correlation relationship information according to the characteristics of the imaging device according to the exposure times. If the difference is a predetermined threshold value or more, the area is set as a motion area.

The detection result integration unit 310 is input with the detection results of the correlation detection units 301 to 303 and performs a process of determining that the pixel area determined to be the motion area is the final motion area with respect to any one of the detection results. The detection result integration unit 310 outputs motion area detection information 143 including the aforementioned information.

The motion area detection information 143 output from the detection result integration unit 310 is configured with, for example, pixel-corresponding motion area detection information or the like, in which motion area pixel=1 and non-motion area pixel=0.

The configuration of the embodiment may also be adapted to a configuration where a process of generating the combined images is unnecessary and the generation of the combined images is not performed. In addition, the configuration of the embodiment may also be adapted to a configuration where, before the starting of the combined image, determining the motion area through the process illustrated in FIG. 24 and performing correction or the like on the motion area by using the result of the determination, the combined images are generated.

Hereinbefore, the plurality of embodiments (first to tenth embodiments) is described.

According to the first to third embodiments, for example, in the case where the imaging device having the configuration disclosed in the aforementioned Japanese Unexamined Patent Application Publication No. 2008-99158 is employed, it is possible to effectively detect the moving subject area.

The first embodiment has the simplest configuration. Although the second embodiment uses a higher speed than that of the first embodiment, it is possible to obtain more refined detection. Although the third embodiment has a more complicated configuration, it is possible to obtain refinement with the same processing speed as that of the first embodiment.

In the configurations according to the fourth to eighth embodiments, it is possible to detect a very large amount of image quality deterioration.

In the ninth embodiment, although the complicated process results in an increase of the circuit size, it is possible to perform detection with high performance.

In the tenth embodiment, even in the case where the previous combined images may not be obtained, it is possible to detect the moving subject area relatively well.

Hereinbefore, the invention is described in detail with reference to specific embodiments. However, it is obvious to the ordinarily skilled in the art that modifications or substitutions are available within the scope without departing from the spirit of the invention. In other words, since the invention is described in an exemplary sense, the invention may not have to be analyzed in a limitative sense. In the determination of the spirit of the invention, the Claims have to be considered.

In addition, a series of processes described in the specification may be implemented in a hardware manner, in a software manner, or in a combination thereof. In the case where the processes are implemented in a software manner, a program recording process sequences may be installed in a memory in a computer, which is assembled into dedicated hardware, to be executed. In addition, the program may be installed in a general-purpose computer which may execute various processes, to be executed. For example, the program may be recorded in a recording medium in advance. In addition to the installation from the recording medium to the computer, the program may be received through a network such as a LAN (Local Area Network) and the Internet and installed in the recording medium such as a built-in hard disk.

In addition, the various processes disclosed in the specification may be performed in a time sequence according to the disclosure. In addition, the processes may be performed in parallel or individually according to the processing performance of the apparatus which performs the processes or according to necessity. In addition, in the specification, a system denotes a logically integrated configuration of a plurality of apparatuses, and each apparatus of the configuration is not limited to be included within the same casing.

The present application contains subject matter related to that disclosed in Japanese Priority Patent Application JP 2009-216529 filed in the Japan Patent Office on Sep. 18, 2009 and JP 2009-288018 filed on Dec. 18, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image combination unit which generates combined images by combining photographed images having different exposure times;
a motion area detection unit which performs a comparison process on a plurality of the combined images generated by the image combination unit to acquire a pixel value difference and which performs a motion area detection process of comparing the pixel value difference with a predetermined threshold value and determining a pixel area, of which the pixel value difference is equal to or larger than the threshold value, to be a motion area where motion of a subject is estimated to have occurred;
a before-combination image comparison unit which acquires the pixel value difference between to-be-combined images by comparing output values of the corresponding pixels between the to-be-combined images which are sources for generation of the combined images; and
an over-detection removing unit which compares the pixel value difference between the to-be-combined images with a predetermined second threshold value and determines a pixel area, of which the pixel value difference between to-be-combined images is less than the second threshold value, not to be the motion area with respect to the corresponding pixels of the motion area detected by the motion area detection unit.

2. The image processing apparatus according to claim 1, wherein the image combination unit is configured to generate the combined images by combining a newly input image and an input-completed photographed image having a different exposure time every time when one photographed image having a different exposure time is input, and
wherein the motion area detection unit performs the motion area detection process by comparing the pixel values of the corresponding pixels of two consecutive combined images generated by the image combination unit.

3. The image processing apparatus according to claim 1 or 2,
wherein the image processing apparatus includes an image quality deterioration area detection unit which determines a pixel area in which pixels of the photographed images having different exposure times are set to the adjacent pixels on the combined images as an image quality deterioration area by using pixel-corresponding selection information of the to-be-combined images, which are sources for generation of the combined images, and outputs image quality deterioration motion area detection information in which a pixel area, which is the motion area detected by the motion area detection unit and which is the image quality deterioration area, is extracted as an image quality deterioration motion area.

4. The image processing apparatus according to claim 1 or 2,
wherein the image processing apparatus includes:
an output value valid area detection unit which acquires pixel values of the to-be-combined images with respect to the pixels of the combined images by using pixel-corresponding selection information on the to-be-combined images, which are sources for generation of the combined images, and determines the pixel area to have a low validity of an output value in the case where the pixel values of the to-be-combined images are in the vicinity of zero or a saturated value; and
an image quality deterioration area detection unit which determines the pixel area having a low validity of the output value detected by the output value valid area detection unit as an image quality deterioration area having a high possibility of the image quality deterioration and which outputs image quality deterioration motion area detection information indicating that the pixel area, which is the motion area detected by the motion area detection unit and which is the image quality deterioration area, is extracted as the image quality deterioration motion area.

5. The image processing apparatus according to claim 1 or 2,
wherein the image processing apparatus includes:
a second motion area detection unit which determines the pixel, which is a pixel of a long time exposure image as a pixel used for the combined images and which has a valid pixel value so that a value of a pixel of a short time exposure image corresponding to the pixel is not in the vicinity of zero, to be in the motion area by using pixel-corresponding selection information of the to-be-combined images which are sources for generation of the combined images; and
a detection result integration unit which outputs motion area detection information in which the area, which is determined to be the motion area by the motion area detection unit and which is determined to be the motion area by the second motion area detection unit, is set to a final motion area.

6. An imaging apparatus having an image processing apparatus,
wherein the image processing apparatus further includes:
an imaging device which captures photographed images having different exposure times; and
an image processing unit which performs image processing according to claim 1.

7. An image processing method performed in an image processing apparatus, comprising the steps of:
generating, by an image combination unit, combined images by combining photographed images having different exposure times;
performing, by a motion area detection unit, a comparison process on a plurality of the combined images generated by the image combination unit to acquire a pixel value difference and performing a motion area detection process of comparing the pixel value difference with a predetermined threshold value and determining a pixel area, of which the pixel value difference is equal to or larger than the threshold value, to be a motion area where motion of a subject is estimated to have occurred;
acquiring the pixel value difference between to-be-combined images by comparing output values of the corresponding pixels between the to-be-combined images, which are sources for generation of the combined images; and
comparing the pixel value difference between the to-be-combined images with a predetermined second threshold value and determining a pixel area, of which the pixel value difference between to-be-combined images is less than the second threshold value, not to be the motion area with respect to the corresponding pixels of the motion area detected by the motion area detection unit.

8. A non-transitory computer readable storage device storing a computer program, which when executed by a computer, performs a method comprising the steps of:
generating, by an image combination unit, combined images by combining photographed images having different exposure times;
performing, by a motion area detection unit, a comparison process on a plurality of the combined images generated by the image combination unit to acquire a pixel value difference and to perform a motion area detection process of comparing the pixel value difference with a predetermined threshold value and determining a pixel area, of which the pixel value difference is equal to or larger than the threshold value, to be a motion area where motion of a subject is estimated to have occurred;
acquiring the pixel value difference between to-be-combined images by comparing output values of the corresponding pixels between the to-be-combined images, which are sources for generation of the combined images; and
comparing the pixel value difference between the to-be-combined images with a predetermined second threshold value and determining a pixel area, of which the pixel value difference between to-be-combined images is less than the second threshold value, not to be the motion area with respect to the corresponding pixels of the motion area detected by the motion area detection unit.

* * * * *